United States Patent [19]

Nagasuka et al.

[11] Patent Number: 5,634,120
[45] Date of Patent: May 27, 1997

[54] COMPUTER SYSTEM SUPPORTING UTILIZATION OF UTILITY FUNCTIONS APPLICABLE TO CONCURRENTLY EXECUTING JOBS BY MONITORING JOB EXCUTION CHARACTERISTICS AND DETERMINING ELIGIBLE JOB COMBINATIONS FOR UTILITY FUNCTION

[75] Inventors: Hirofumi Nagasuka, Yokohama; Yoshiaki Shinmura, Chigasaki; Toshiaki Arai, Sagamihara, all of Japan

[73] Assignee: Hitachi, Ltd., Tokyo, Japan

[21] Appl. No.: 49,508

[22] Filed: Apr. 19, 1993

[30] Foreign Application Priority Data

Apr. 22, 1992 [JP] Japan ................................. 4-102852

[51] Int. Cl.$^6$ .................................................. G06F 9/00
[52] U.S. Cl. ......................... 364/608; 364/DIG. 1; 364/280; 364/281; 364/281.3; 364/282; 395/670
[58] Field of Search .............. 364/DIG. 1, 264, 364/264.6, 281, 281.3, 280–281.7; 395/650, 425, 700, 600

[56] References Cited

U.S. PATENT DOCUMENTS

| | | | |
|---|---|---|---|
| 3,707,725 | 12/1972 | Dellheim | 444/1 |
| 4,642,756 | 2/1987 | Sherrod | 364/200 |
| 4,658,351 | 4/1987 | Teng | 364/200 |
| 4,779,194 | 10/1988 | Jennings et al. | 364/200 |
| 4,796,178 | 1/1989 | Jennings et al. | 364/200 |
| 4,805,107 | 2/1989 | Kieckhafer et al. | 364/200 |
| 4,829,422 | 5/1989 | Morton et al. | 364/200 |
| 4,964,040 | 10/1990 | Wilcox | 364/200 |
| 5,193,186 | 3/1993 | Tamaki et al. | 395/650 |

OTHER PUBLICATIONS

King, Gary M. "Processor Storage Estimation," CMG '88 Proceedings, pp. 1044–1057 (English).

"Excel Batch" provided by Fujitsu, Nikkei Computer, No. 237, 1990, pp. 135–136 and 146–147 (Japanese).

*Primary Examiner*—Alvin E. Oberley
*Assistant Examiner*—Jonathan Hall Backenstose
*Attorney, Agent, or Firm*—Fay, Sharpe, Beall, Fagan, Minnich & McKee

[57] ABSTRACT

A computer system supports the application of a function supplied by the Operating System (OS) or a utility program. A generating section generates system operation information including job execution history information and file access history information. In accordance with the system operation information, a determining section determines a job or job step to which the function can be applied. In response to a notice from the determining section, a converting section converts an original job control program or job into new job control programs or jobs, and outputs the new job control programs or jobs.

11 Claims, 18 Drawing Sheets

| | | |
|---|---|---|
| 721 | NEXT PSTP TABLE ADDRESS | 720 |
| 722 | PRECEDING PSTP TABLE | |
| 723 | START PDD TABLE ADDRESS | |
| 724 | END PDD TABLE ADDRESS | |
| 725 | JOB STEP NAME | |
| 726 | JOB STEP EXECUTION START TIME | |
| 727 | JOB STEP EXECUTION END TIME | |
| 728 | JOB STEP NUMBER | |

| | | |
|---|---|---|
| 731 | NEXT PDD TABLE ADDRESS | 730 |
| 732 | PRECEDING PDD TABLE ADDRESS | |
| 733 | FD NAME | |
| 734 | FILE NAME | |
| 735 | DEVICE INFORMATION | |
| 736 | IDENTIFIER | |
| 737 | FILE ACCESS NUMBER | |
| 738 | FILE ACCESS START TIME | |
| 739 | FILE ACCESS END TIME | |
| 73A | ACCESS METHOD | |

FIG. 18

| | | |
|---|---|---|
| 2210 | ORIGINAL FILE NAME | 2200 |
| 2215 | NEW FILE NAME | |
| 2220 | INPUT SIDE NEW JOB NAME | |
| 2225 | OUTPUT SIDE JOB NAME | |
| 2230 | OUTPUT SIDE JOB STEP NAME | |
| 2235 | OUTPUT SIDE FD NAME | |
| 2240 | INPUT SIDE JOB NAME | |
| 2245 | INPUT SIDE JOB STEP NAME | |
| 2250 | INPUT SIDE FD NAME | |
| 2255 | OUTPUT SIDE JOB STATEMENT ADDRESS | |
| 2260 | OUTPUT SIDE EXEC STATEMENT ADDRESS | |
| 2265 | OUTPUT SIDE FD STATEMENT ADDRESS | |
| 2270 | INPUT SIDE JOB STATEMENT ADDRESS | |
| 2275 | INPUT SIDE EXEC STATEMENT ADDRESS | |
| 2280 | INPUT SIDE FD STATEMENT ADDRESS | |

FIG. 19

```
"TEST 1     JOB
"STEP 1    STEP    PROGRAM = WRITE
"INFD      FD      FILE = TEMP. DATA, DEVICE = DISK,
                   TYPE = OLD
"OUTFD     FD      FILE = TEMPORARY, DEVICE = DISK,
                   TYPE = (NEW, PASS)
"*
"STEP 2    STEP    PROGRAM = READ
"INPUT     FD      FILE = TEMPORARY, DEVICE = DISK,
                   TYPE = (OLD, DELETE)
"OUTPUT    FD      FILE = NEW, DATA, DEVICE = DISK,
                   TYPE = OLD
```
130

FIG. 20A

```
"TEST 1     JOB
"STEP 1    STEP    PROGRAM = WRITE
"INFD      FD      FILE = TEMP. DATA, DEVICE = DISK,
                   TYPE = OLD
"OUTFD     FD      FILE = TEMPORARY, DEVICE = PREST,
                   TYPE = SHARE
```
140A

FIG. 20B

```
"TEST 2     JOB
"STEP 2    STEP    PROGRAM = READ
"INPUT     FD      FILE = TEMPORARY, DEVICE = PREST,
                   TYPE = SHARE
"OUTPUT    FD      FILE = NEW, DATA, DEVICE = DISK,
                   TYPE = OLD
```
140B

COMPUTER SYSTEM SUPPORTING UTILIZATION OF UTILITY FUNCTIONS APPLICABLE TO CONCURRENTLY EXECUTING JOBS BY MONITORING JOB EXCUTION CHARACTERISTICS AND DETERMINING ELIGIBLE JOB COMBINATIONS FOR UTILITY FUNCTION

BACKGROUND OF THE INVENTION

1. Field of the Invention

The present invention relates generally to a computer system, and particularly to a computer system having a support function for allowing the application of the functions provided by an OS (operating system) and utility programs.

2. Description of the Related Art

Highly sophisticated recent operating systems (OSs) and utility programs are provided with a variety of functions. As an example of tools supporting such functions, there is known "VLFAID" which supports the application of the program loading speed-up function "VLF" provided by IBM (refer to CMG'88 Proceeding, pp. 1044 to 1057). "VLFAID" monitors the state of program loading and notifies the user of the availability of "VLF" relative to the program library. Also known is a batch processing time reduction function "PREST" provided by HITACHI as one of the OS functions (refer to Nikkei Computer, No.237, pp.135 and 136, and pp. 146 to 147). "PREST" reduces the batch processing time by transferring the intermediate data between jobs via a buffer in a memory device. A function "Excel Batch" provided by FUJITSU is also known which is similar to "PREST" (refer to Nikkei Computer, No.237, pp. 135 and 136, pp. 146 and 147).

Although "VLFAID" has the function of notifying a user of the availability of "VLF", it has no function of supporting the application of "PREST" and "Excel Batch". A user is often bothered about what process is applied with which function among a variety of functions provided by an OS and utility programs. A tool for supporting the application of such functions has long been desired.

Furthermore, the application of "PREST" or "Excel Batch" is limited to only a process of sequentially accessing records of a file starting from the first record to the last one, for the succession of the intermediate data. It is therefore necessary for a user to analyze a batch program and list up processes. However, the batch program, for example, for the computation of data of on-line business transactions, is voluminous with several hundreds of job steps, requiring much labor of list-up works.

Still further, "PREST" or "Excel Batch" can be applied for the succession of the intermediate data between jobs. However, the intermediate data succession is generally performed between job steps of one job. For this reason, a user is requested to execute one job by dividing it into a plurality of job steps, taking a lot of time and labor.

SUMMARY OF THE INVENTION

The present invention has been made considering the above circumstances. It is an object of the present invention to provide a computer system supporting the effective application of basic or semibasic program functions such as "VLF", "PREST" and "Excel Batch" supplied by an OS and utility programs.

According to one aspect of the present invention, there is provided a computer system capable of automatically searching job portions of a job control program (JCP) to which functions supplied by an OS and utility programs can be applied.

According to a second aspect of the present invention, there is provided a computer system capable of converting the searched each job portion which one of the functions can be applied into new job portions.

According to a third aspect of the present invention, there is provided a computer system capable of automatically searching job step portions of a JCP to which the functions supplied by an OS and utility programs can be applied.

According to a fourth aspect of the present invention, there is provided a computer system capable of converting a searched each job step portion to which one of the functions can be applied into new job step portions.

According to the computer system of the present invention, this system supports a user to effectively and easily use the functions of an OS and utility programs. Also, according to the computer system of the present invention, a job or job step is converted so as to allow a user to use the functions of the OS and utility programs, reducing the burden on the user and hence considerably reducing the overhead of the computer system in using the functions.

BRIEF DESCRIPTION THE DRAWINGS

FIG. 18 shows the format of a parameter table MPRM;

FIG. 19 shows an example of an original job;

FIGS. 20A and 20B show new jobs obtained by converting the original job shown in FIG. 19;

DESCRIPTION OF THE PREFERRED EMBODIMENTS

A computer system according to an embodiment of the present invention will be described with reference to the accompanying drawings. The embodiment is used only for the illustrative purpose, and is not intended to limit the scope of the present invention.

In the computer system of this embodiment in which the batch processing time reduction function, the "PREST", is taken as an example, a data succession process between job steps is examined based on file access start and end times, and an original JCL job control statements (to be referred to as a job control program (JCP)) is converted into a new JCP.

Figure 1:
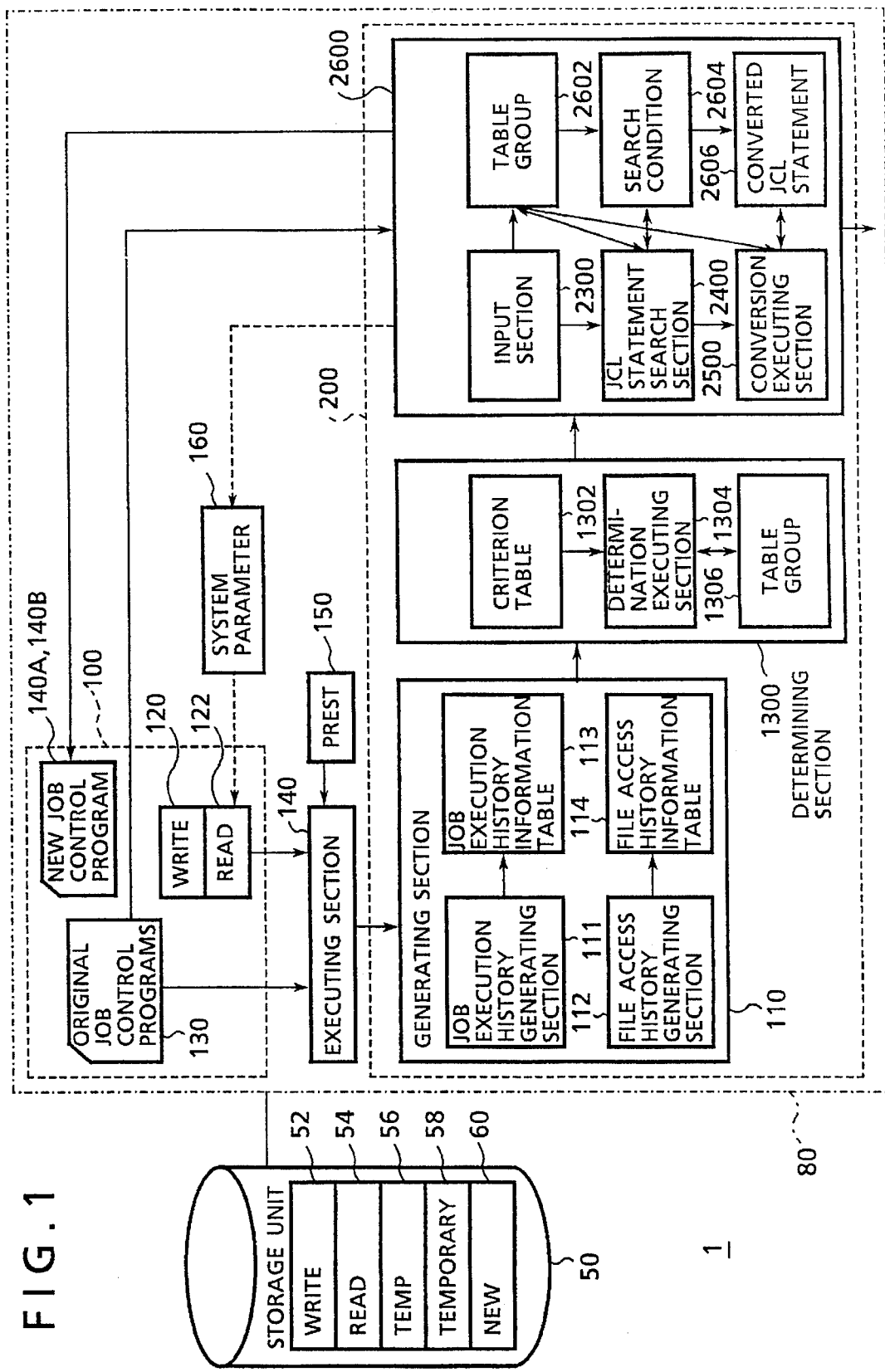
FIG. 1 is a functional block diagram of the computer system according to an embodiment of the present invention.

FIG. 1 is a functional block diagram of the computer system 1. This system 1 has a main unit 80 and an external storage unit 50 such as a disk. The storage unit 50 stores programs "WRITE" and "READ" and data files "TEMP", "NEW", and "TEMPORARY". The main unit has a program area 100, a job executing unit 140, a "PREST" executing unit 150, a system parameter storage unit 160, and a supporting unit 200. The program area 100 stores original JCPs 130, programs "WRITE" and "READ" loaded from the storage unit 50, and new converted JCPs 140A and 140B.

The supporting section 200 includes an information generating section 110, a job determining section 1300, and a converting section 2600. The information generating section 110 generates the information representative of the operation state of the system while executing each JCP written by JCL (Job Control Language). The job determining section 1300 determines whether the job can be applied with the functions provided by the OS or utilities. The converting section 2600 converts the original JCP into a new JCP. The generating section 110 has a section 111 for generating information of job execution history, and a section 112 for generating information of file access history.

When each of routine original JCPs each associated with jobs 130 is executed on the computer system 1, the generating section 110 monitors the execution of each job. More specifically, the generating section 111 generates the information of job execution start and end times and the information of each job step start and end times, and outputs such information as execution history information 113. The generating section 112 generates the information of files accessed during the execution of each job, and outputs it as file access history information 114.

The determining section 1300 has a determination executing section 1304, a criterion table 1302 for storing criteria indicating which function of the OS can be applied to the JCP, and a table group 1306 for storing the information 113 and 114. The determination executing section 1304 generates the table group 1306 from the job execution history information 113 and file access history information 114 supplied from the generating section 110. In accordance with the criteria stored in the table 1302, a job or job step which the time reduction function can be applied is searched and notified to the converting section 2600.

The converting section 2600 has an input section 2300, a JCL statement search section 2400, and a conversion executing section 2500. The input section 2300 of the converting section 2600 receives an original JCP notified by the determining section 1300, and generates a table group 2602. Referring to the table group 2602 and search conditions 2604, the JCL statement search section 2400 searches JCL statements from the original JCP 130. Referring to replacement JCL statements 2606, the conversion executing section 2500 converts the original job 130 into a new JCP including programs 140A and 140B and outputs them.

Figure 2:
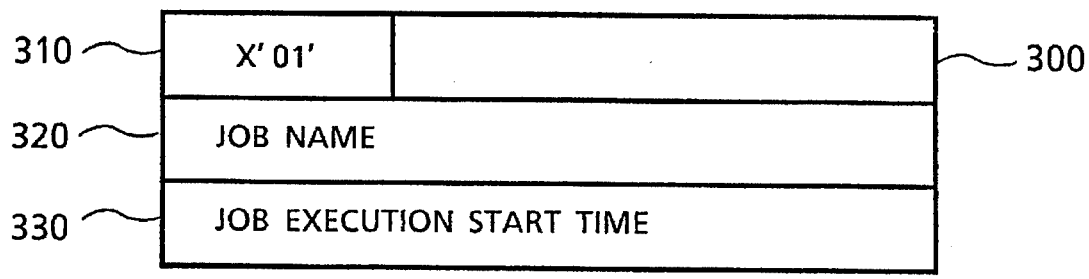
FIG. 2 shows the format of a job execution start information table.
Figure 3:
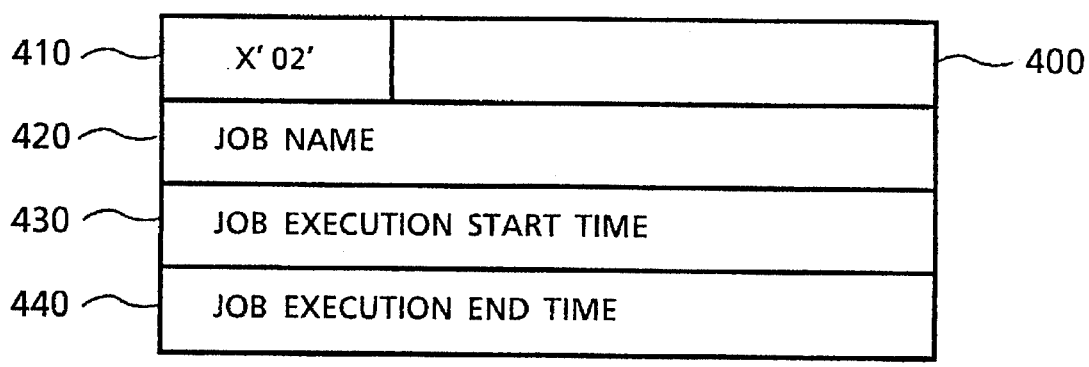
FIG. 3 shows the format of a job execution end information table.
Figure 4:
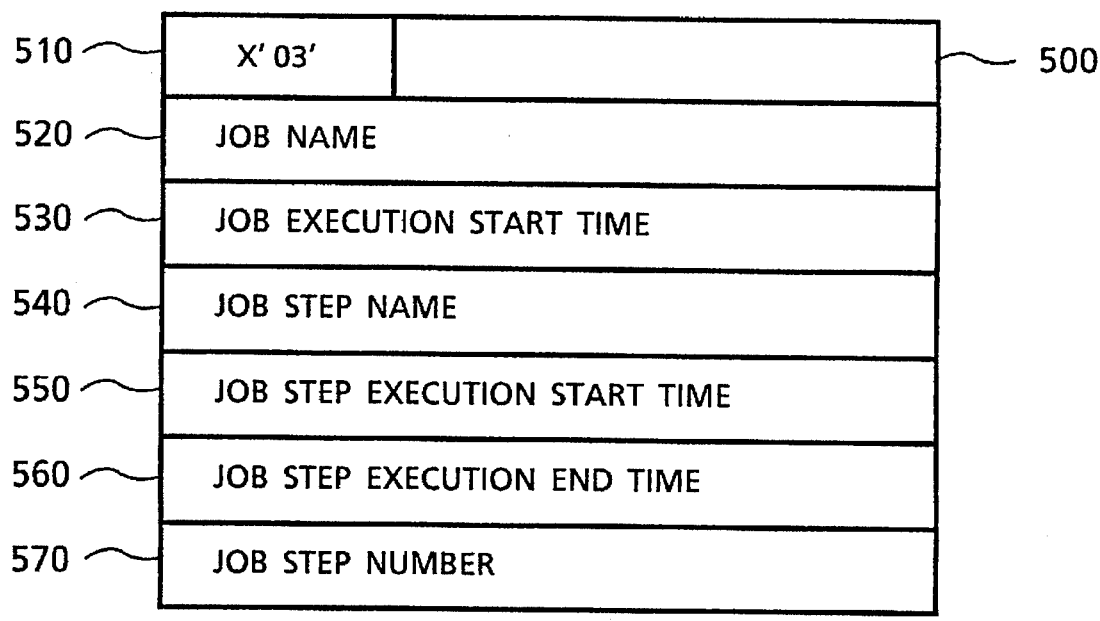
FIG. 4 shows the format of a job step execution end information table.

Next, the information to be generated by the generating section 110 will be described with reference to FIGS. 2 to 5. FIG. 2 shows the table format of job execution start information 300 to be generated by the generating section 111. An identifier X'01' indicating the type of information is stored in a field 310, a job name in a field 320, and a job execution start time in a field 330. FIG. 3 shows the table format of job execution end information to be generated by the generating section 111. An identifier X'02' indicating the type of information is stored in a field 410, a job name in a field 420, a job execution start time in a filed 430, and a job execution end time in a field 440. FIG. 4 shows the table format of job step execution end information to be generated by the generating section 111. An identifier X'03' indicating the type of information is stored in a field 510, a name of the job to which the executed job step belongs in a field 520, a job execution start time in a field 530, a job step name in a field 540, a job step execution start time in a field 550, a job step execution end time in a field 560, and a job step number in a field 570. The job step number represents the executed order of each job step of the job.

Figure 5:
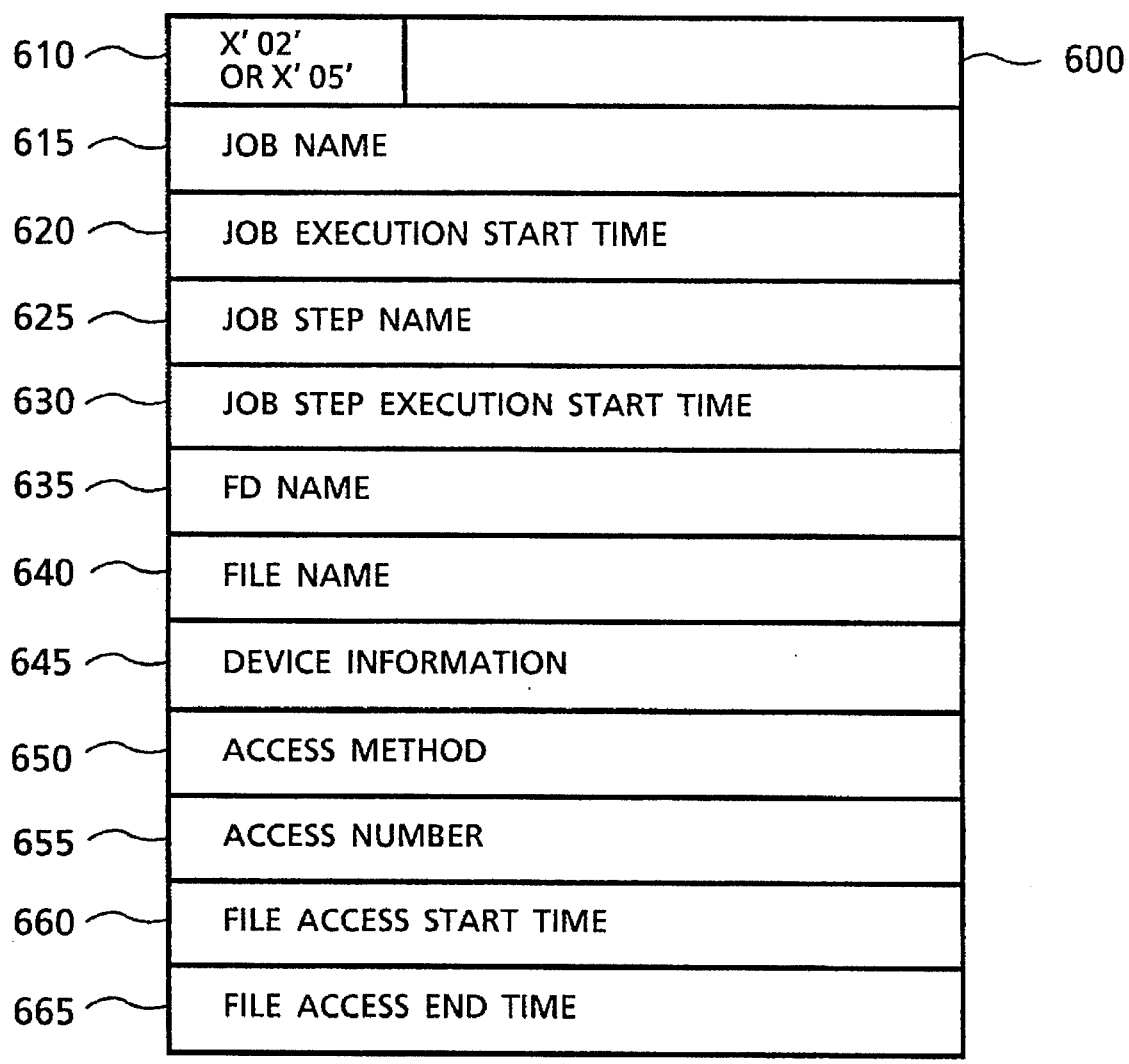
FIG. 5 shows the format of a file access history information table.

FIG. 5 shows the table format of file access history information 600 to be generated by the section 112 during the job execution. An identifier indicating the type of information is stored in a field 610. The identifier X'04' is used when data is inputted from the file, and whereas the identifier X'05' is used when data is outputted to the file. The name of a job to which the program accessing the file belongs is stored in a field 615, a job execution start time in a field 620, the name of a job step to which the program accessing the file belongs in a field 625, and a job step execution start time in a field 630. An FD name is stored in a field 635, the information of a device storing the file in a field 645, an access method of accessing the file, e.g., a record access order discriminating either a sequential access or random access, in a field 650. The number of times of access to the file is stored in a field 655, a file access start time in a field 660, and a file access end time in a field 665.

Figure 6:
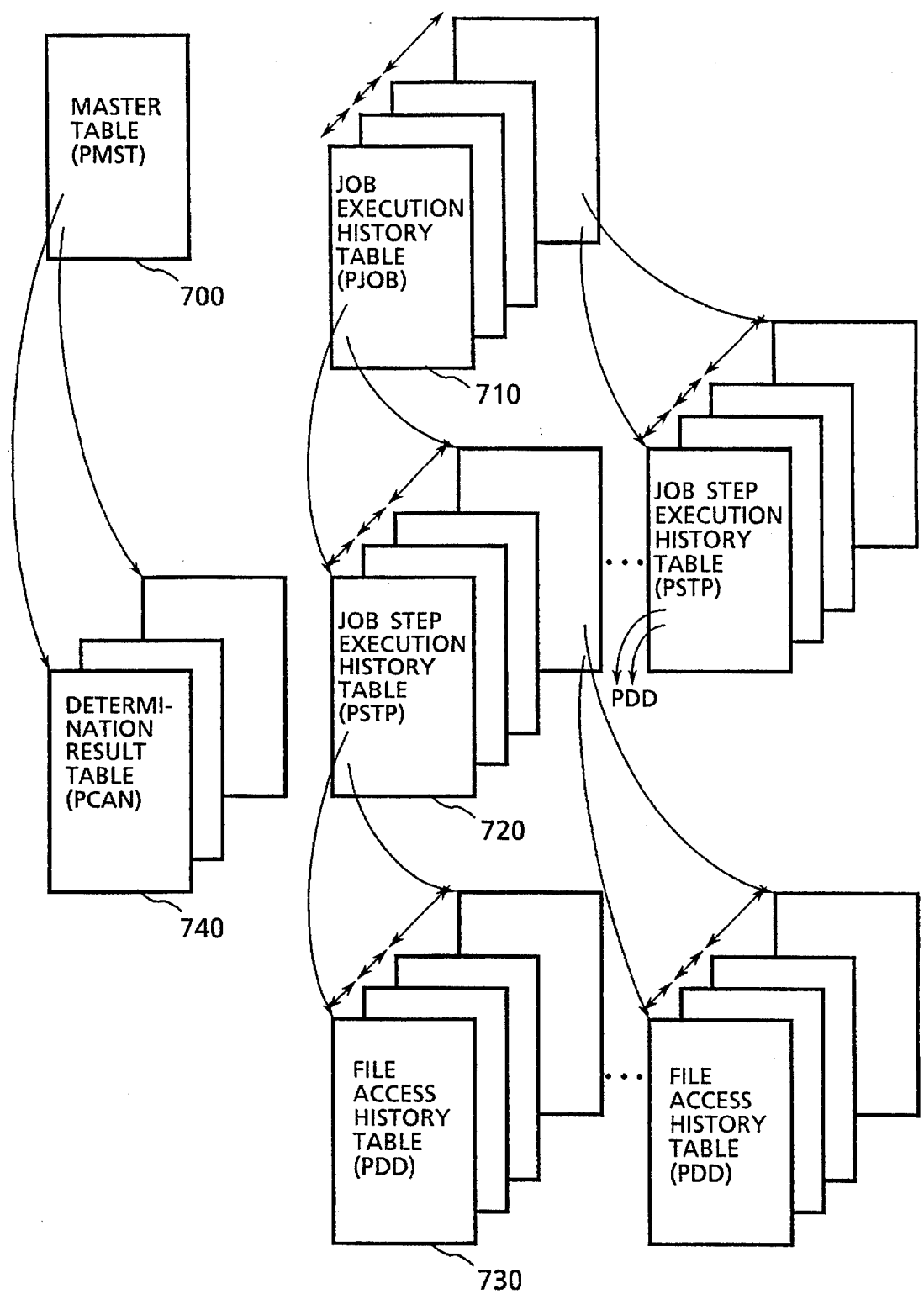
FIG. 6 is a diagram showing the relationship between tables to be used by a determining section shown in FIG. 1.

FIG. 6 shows the relationship between the tables 1306 to be generated by the determining section 1300 from the history information tables 113 and 114 generated by the generating section 110. The table group 1306 includes a master table (PMST), a job execution history table (PJOB) group, a job step execution history table (PSTP) group, a file access table (PDD) group, and a judgement result table (PCAN) group.

Figure 7:
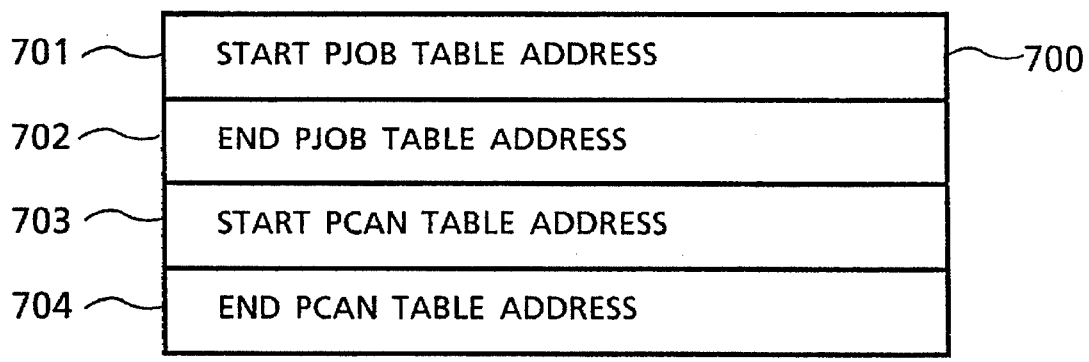
FIG. 7 shows the format of a master table PMST.

FIG. 7 shows the table format of the master table PMST 700. The start PJOB table address is stored in a field 701, the end PJOB table address in a field 702, the start PCAN table address in a field 703, and the end PCAN table address in a field 704. The table PMST 700 is generated when the determining section 1300 is activated, and is used for the queue management of the PJOB tables and determination result tables PCANs.

Figure 8:
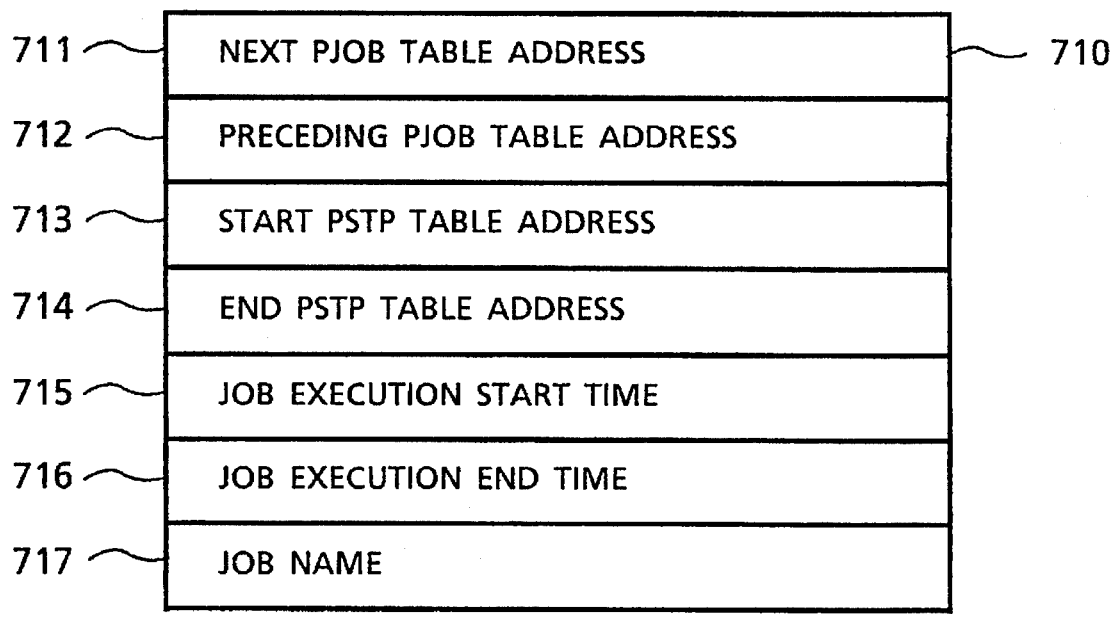
FIG. 8 shows the format of a job execution history table PJOB.

FIG. 8 shows the table format of each PJOB table 710. The next PJOB table address is stored in a field 711, the preceding PJOB table address in a field 712, both the addresses being used to form a queue of the PJOB tables. The start PSTP table address is stored in a field 713, and the end PSTP table address in a field 714, both the addresses being used for the queue management of the PSTP tables. A job execution start time is stored in a field 715, a job execution end time in a field 716, the job name in a field 717, these being copied from the job execution start information table 300 and job execution end information table 400. Each PJOB table is formed when the job execution start information table 300 is inputted, and the PJOB tables are arranged in the sequential order of job execution. Each PJOB table 710 stores part of the information of the job execution start information table 300 and job execution end information table 400, and is used for the queue management of the PSTP tables storing the information of job steps of each job.

Figure 9:
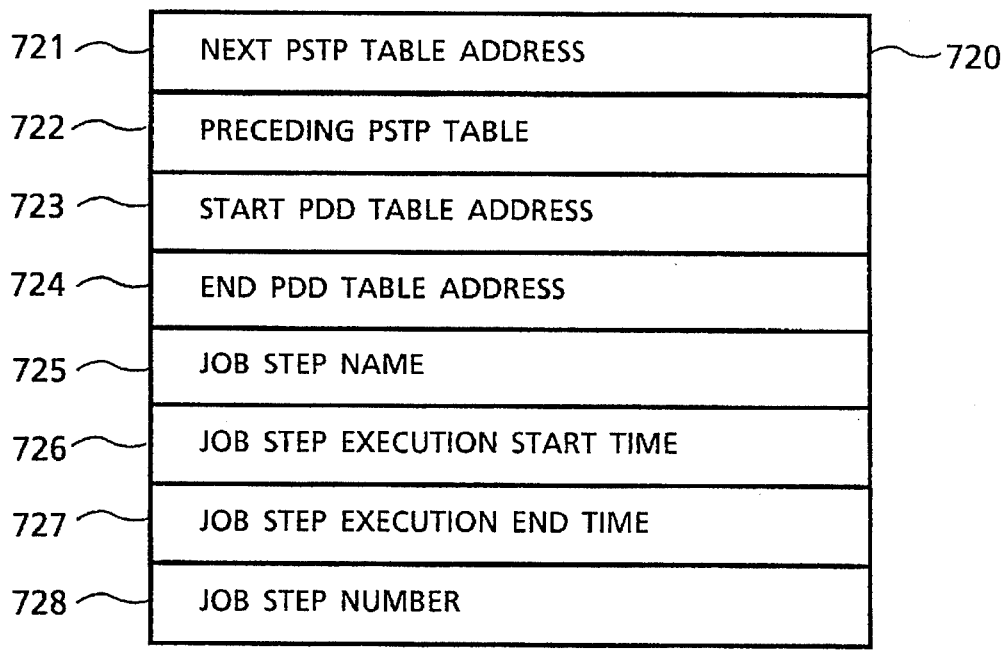
FIG. 9 shows the format of a job step execution history table PSTP.

FIG. 9 shows the table format of each PSTP table 720. A next PSTP table address is stored in a field 721, and a preceding PSTP table address in a field 722, both the addresses being used to form a queue of the PSTP tables. A start PDD table address is stored in a field 723, and an end PDD table address in a field 724, both the addresses being used for the queue management of the PDD tables. A job step name is stored in a field 725, and a job step execution start time in a field 726, these data being copied from the file access history information table 600. A job step execution end time is stored in a field 727, and a job step number in a field 728, these data being copied from the job step execution end information table 600. Each PSTP table 720 is generated when the file access history information table 600 is inputted and if a job step execution history table PSTP 720 for the job step to which the program accessing the file belongs is not still prepared. The PSTP tables 720 are arranged in the sequential order of job step execution. Each PSTP table 720 stores the job step execution start and end times, and is used for the queue management of the PDD tables storing the information of files accessed by job steps.

Figure 10:
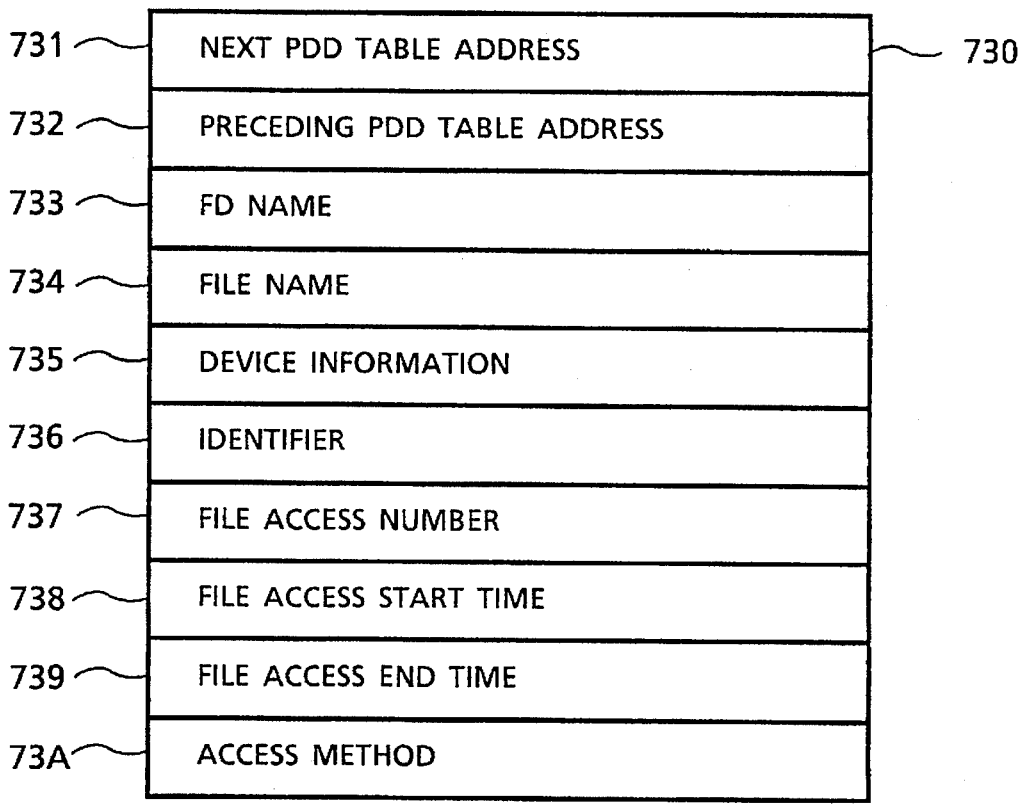
FIG. 10 shows the format of a file access history table PDD.

FIG. 10 shows the table format of each PDD table 730. The next PDD table address is stored in a field 731, and the preceding PDD table address in a field 732, both the addresses being used to form the queue of the PDD tables. The FD name written in the JCP is stored in a field 733, the file name in a field 734, and the information of a unit storing the file in a field 735. An identifier is stored in a field 736, the number of file accesses in a field 737, a file access start time in a field 738, and a file access end time in a field 739. An access method indicating the access order is stored in a field 73A. All the information stored in each PDD table 730 is copied from the file access history information table 600. The PDD Table 730 is generated each time the file access history information table 600 is inputted, and is managed by the addresses in the PSTP table in a queue manner.

Figure 11:
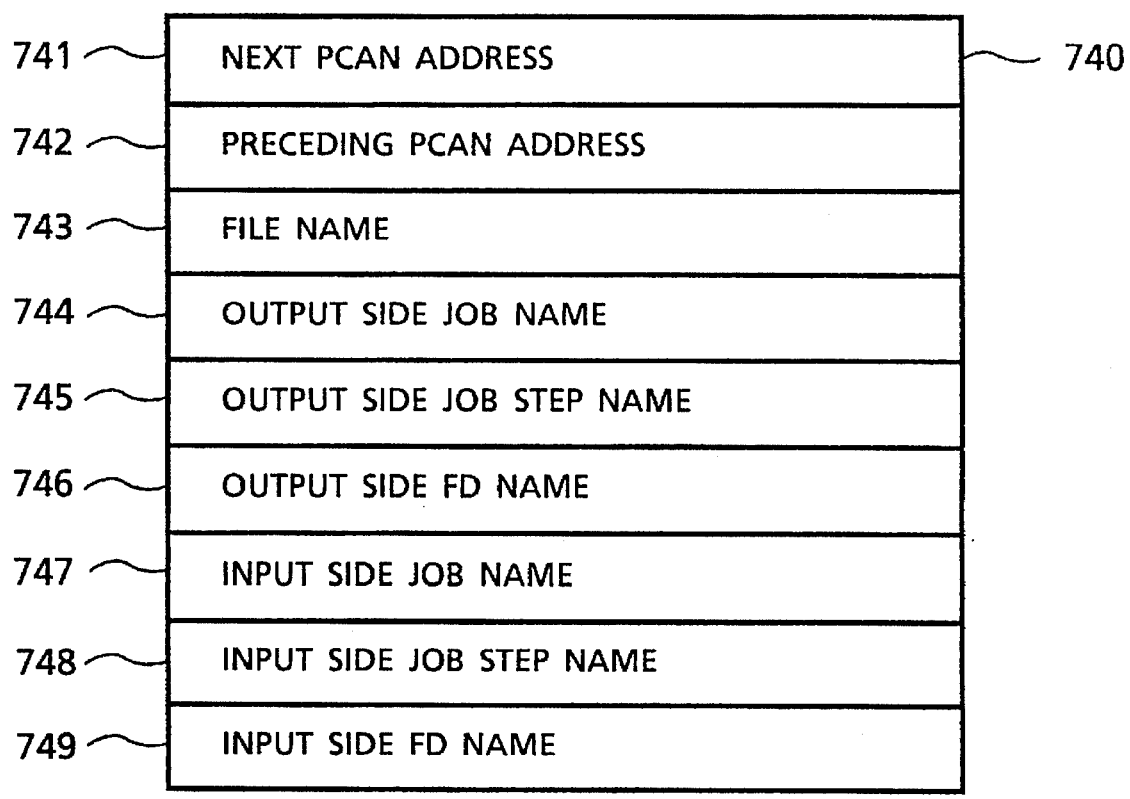
FIG. 11 shows the format of a determination result table PCAN.

FIG. 11 shows the table format of each determination result table PCAN 740. The next PCAN table address is stored in a field 741, and the preceding PCAN table address in a field 742, both the addresses being used to form the queue of the PCAN tables. The start entry and end entry of this queue are managed by the master table PMST 700. The name of a file designated by a JCP for data succession is stored in a field 743. The name of a job at the output side is stored in a field 744, the name of a job step at the output side which executes a program for outputting an intermediate file is stored in a field 745, and the FD name at the output side designating the output destination of the intermediate file is stored in a field 746. The name of a job at the input side is stored in a field 747, the name of a job step at the input side which executes a program for inputting an intermediate file is stored in a field 748, and the FD name at the input side designating the input destination of the intermediate file is stored in a field 749. The determination result table PCAN 740 is generated when a candidate capable of applying the time reduction function is determined.

Figure 12:
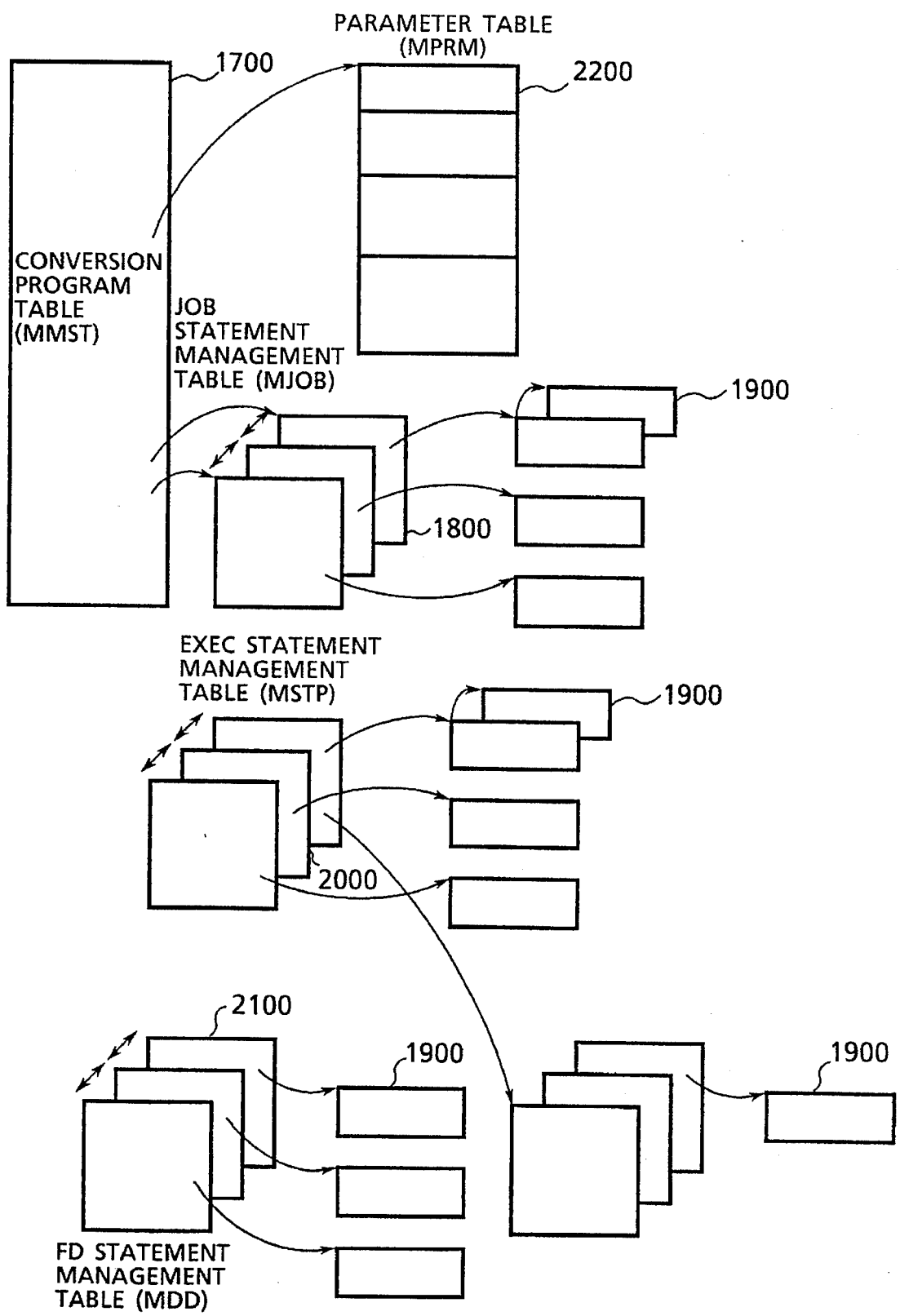
FIG. 12 is a diagram showing the relationship between tables to be used by a converting section shown in FIG. 1.

The converting section 2600 receives an original JCP 130 in response to a notice from the determining section 1300, and generates a conversion program table MMST, a JOB statement management table (MJOB) group, an EXEC statement management table (MSTP) group, an FD statement management table (MDD) group, a job describing record group, and a parameter table (MPRM) group. The relationship between these tables is shown in FIG. 12.

Figure 13:
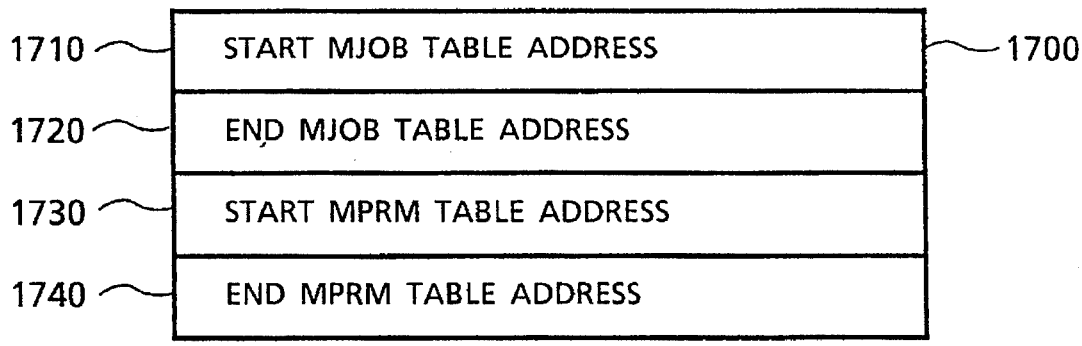
FIG. 13 shows the format of a conversion program table MMST.

FIG. 13 shows the table format of the MMST table 1700. The start MJOB table address is stored in a field 1710, the end MJOB table address in a field 1720, the start MPRM table address in a field 1730, and the end MPRM table address in a field 1740. The MMST table 1700 is a master table which is used for the queue management of the MJOB tables and the MPRM table 1800 which manages portions of the original JCP 130 to be converted.

Figure 14:
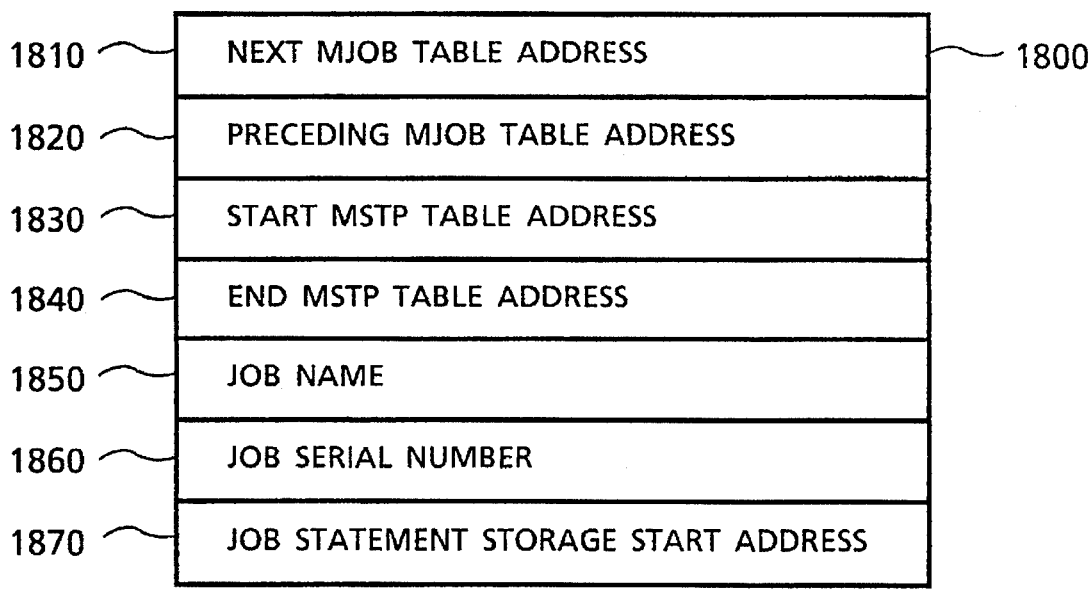
FIG. 14 shows the format of a JOB statement management table MJOB.

FIG. 14 shows the table format of each MJOB table 1800. The next MJOB table address is stored in a field 1810, and the preceding MJOB table address in a field 1820, both the addresses being used to form the queue of the MJOB tables. The next MSTP table address is stored in a field 1830, and the preceding MSTP table address in a field 1840, both the addresses being used for the queue management of the MSTP tables. The job name is stored in a field 1850, and a job serial number in a field 1860. The job serial number represents the order of a JCL statement inputted from the input section 2300. A JOB statement storage start address is stored in a field 1870. Namely, this address points the job describing record 1900 storing the first JCL statement of "JOB", i.e., JOB statement. The MJOB table 1800 is generated when the input section 2300 inputs the original JCP 130, and stores the information of a JOB statement.

Figure 16:
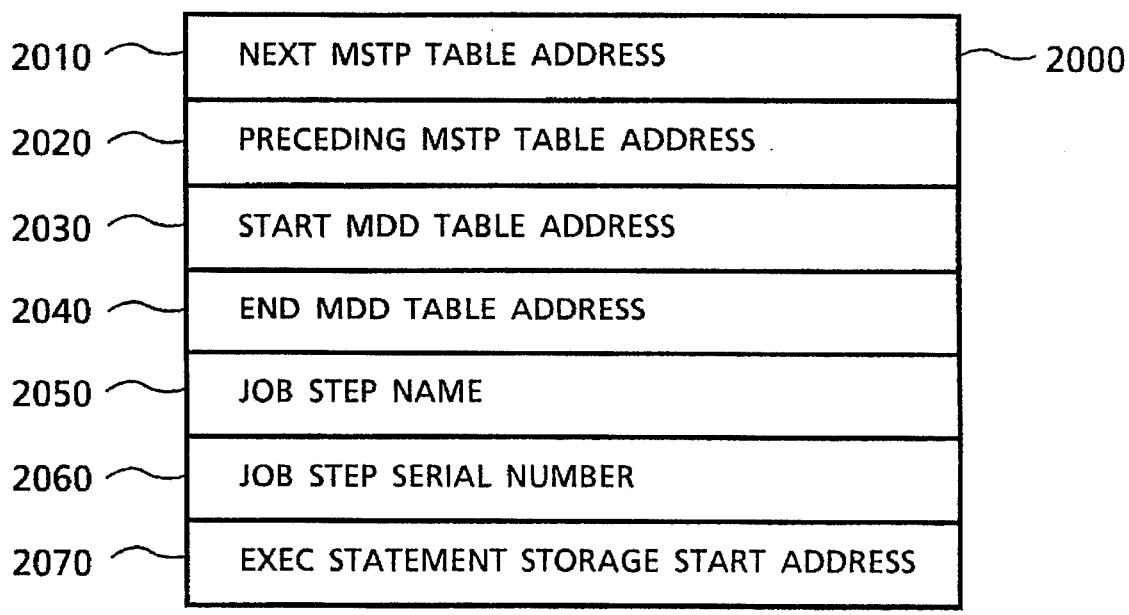
FIG. 16 shows the format of an EXEC statement management table MSTP.

FIG. 16 shows the table format of each MSTP table 2000. The next MSTP table address is stored in a field 2010, and the preceding MSTP table address in a field 2020, both the addresses being used to form the queue of the MSTP tables. The start MDD table address is stored in a field 2030, and the end MDD table address in a field 2040, both the addresses being used for the queue management of the MDD tables. The job step name is stored in a field 2050, and a job step serial number in a field 2060. The job step serial number represents the order of a job step within the same job. An EXEC statement storage start address is stored in a field 2070. Namely, this address points the job describing record 1900 storing the first JCL statement of "EXECUTION", i.e., EXEC statement. Each MSTP table 200 is generated when the input section inputs the original JCP 130, and stores the information of the EXEC statement belonging to the job written with the JOB statement corresponding to the MJOB table 1800.

Figure 17:
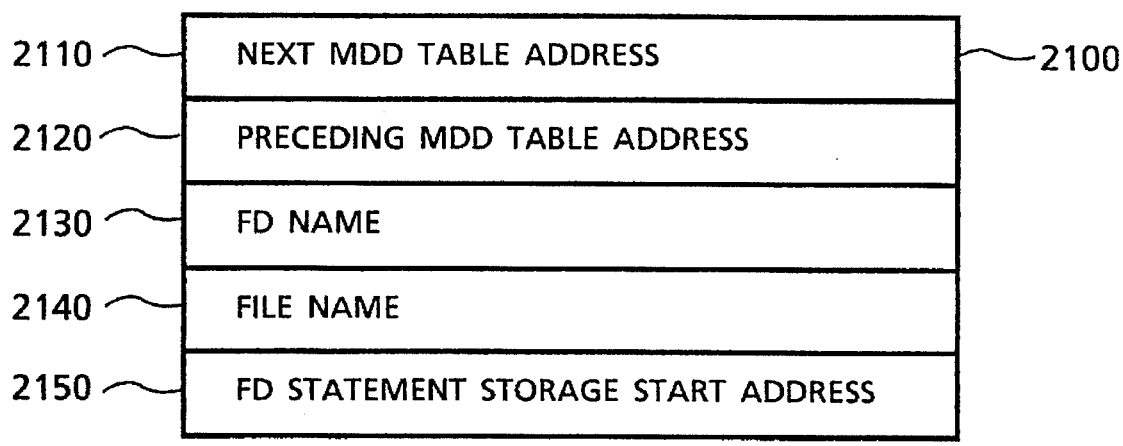
FIG. 17 shows the format of an FD statement management table.

FIG. 17 shows the table format of each MDD table 2100. The next MDD table address is stored in a field 2110, and the preceding MDD table address in a field 2120, both the addresses being used to form the queue of the MDD tables.

The FD name is stored in a field 2130, and the file name in a field 2140. An FD statement storage start address is stored in a field 2150. Namely, this address points the job describing record 1900 storing the first JCL statement of "FD", i.e., FD statement. Each MDD table 2100 is generated when the input section inputs the original JCP 130, and stores the information of the FD statement. The MDD tables corresponding to the FD statements declared within the same job step forms a queue.

Figure 15:
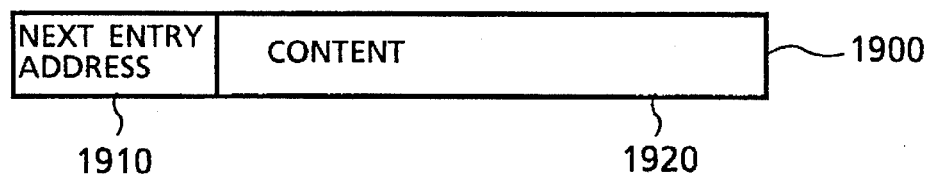
FIG. 15 shows the format of a job describing record.

FIG. 15 shows the format of each job describing record. The next entry address is stored in a field 1910, for the case where one JCL statement is stored in a plurality of records. The contents of description of the original JCP inputted by the input section 2300 is stored in a field 1920.

Each job describing record 1900 is generated when the input section 2300 inputs the original JCP. The job describing record 1900 is pointed by the MJOB table 1800 when the inputted JCL statement is a JOB statement. The record 1900 is pointed by the MSTP table 200 when the inputted JCL statement is an EXEC statement. The record 1900 is pointed by the MDD table when the inputted JCL statement is an FD statement. If one JCL statement is over a plurality of lines, a plurality of job describing records form a queue.

FIG. 18 shows the table format of the parameter table MPRM 2200. System operation information notified by the determining section 1300 is stored in the table MPRM fields 2210, 2225, 2230, 2235, 2240, 2245, and 2250. Specifically, the file name designated by the original JCP 130 is stored in the field 2210, and the job name on the output side in the field 2225. The name of a job step outputting the intermediate file on the output side job is stored in the field 2230, the name of an FD statement designating the output destination of the intermediate file on the output side job in the field 2235, and the name of a job step inputting the intermediate file on the input side job in the field 2240. The name of the FD statement designating the input destination of the intermediate file on the input side job is stored in the field 2250. Stored in a field 2215 is the name for the new jobs 140A and 140B designated by a file operand "FILE" in the FD statement for the time reduction function. The new job name is set by the input section 2300. The new job name given on the input side job for the new jobs 140A and 140B is stored in a field 2220. The new job name is set by the input section 2300. The addresses of job describing records 1900 are stored in the MPRM table fields 2255, 2260, 2265, 2270, 2275, and 2280, when the JCL statement search section 2400 detects the JCL statements requiring change of the job description contents and it becomes necessary to store such JCL statements in the job describing records 1900. Specifically, the address of the JOB statement on the output side job is stored in the field 2255, the address of the EXEC statement corresponding to the job step outputting the intermediate file in the field 2260, the address of the FD statement designating the output destination of the intermediate file in the field 2265, the address of the JOB statement on the input side job in the field 2270, the address of the EXEC statement corresponding to the job step inputting the intermediate file in the field 2275, and the address of the FD statement designating the input destination of the intermediate file in the field 2280.

Next, the operation of the computer system according to the present invention will be described with reference to FIGS. 21 to 26, by using an original job control program (JCP) 130 illustratively shown in FIG. 19. In the original JCP 130 shown in FIG. 19, "TEST 1" is a job name. "JOB" is a JCL statement declaring a job. "STEP1" is the name of a job step. "STEP1" is a JCL statement designating a program to be executed. "INFD", "OUTFD", "INPUT", and "OUTPUT" are FD names each giving a correspondence between the file designated by the "FD" name and the program. "FD" is a JCL statement designating the input/output destination of data. The operand "FILE" of the "FD" statement designates the name of a file to be accessed. The operand "DEVICE" designates a device storing the file to be accessed. If the operand "TYPE" indicates "OLD", it means that the file has already been generated. If the operand "TYPE" indicates "NEW", it means that the file is generated during execution of a job step. If the operand "TYPE" indicates "DELETE", it means that the file is to be deleted after the completion of a job step. If the operand "TYPE" indicates "SHARE", it means the file has already been generated and a plurality of jobs are allowed to share it (without "SHARE", the file is exclusively used).

Figure 21:
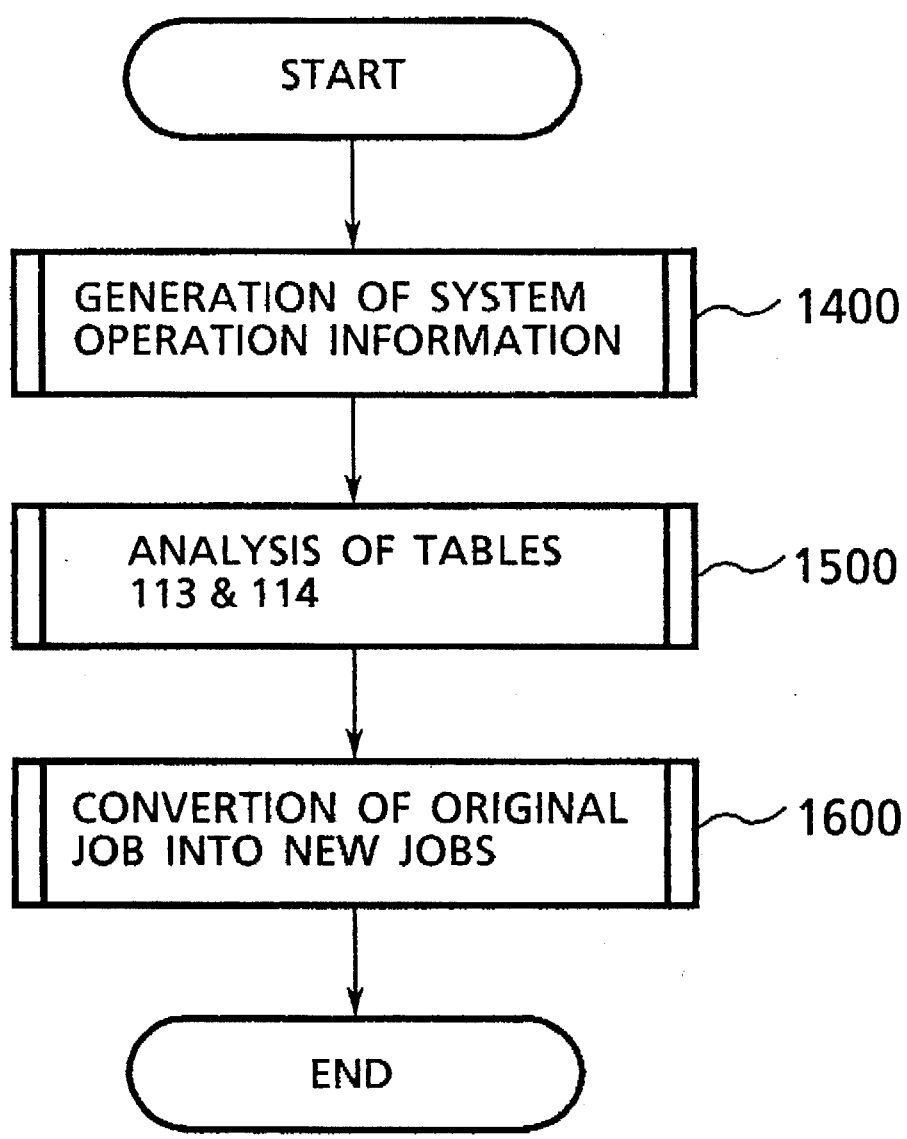
FIG. 21 is a flow chart illustrating the operation of the supporting section for the computer system according to the present invention.

FIG. 21 is a flow chart illustrating the overall operation of the computer system according to the present invention. At Step 1400, when each of jobs of the JCP 130 is executed, there is generated the system operation state information including the job execution history information tables 113 and file access history information tables 114. At Step 1500, referring to the tables 113 and 114, there are generated the job execution history table PJOB group, job step execution history table PSTP group, file access history table PDD group, and master table PMST. Thereafter, the tables 113 and 114 are analyzed to determine jobs or job steps to which the batch processing time reduction function can be applied. Namely, this determination is performed while paying attention to the intermediate file succession process between jobs or job steps. If jobs capable of applying the time reduction function are found, the determination result table PCAN group 740 is generated. At Step 1600, the conversion process is performed in accordance with the information stored in the PCAN tables 740.

The details at Step 1400 will be given below. The original JCP 130 is executed by the executing section 140. At the job step "STEP1", the program "WRITE" is loaded from the storage unit 50 to the program area 100 as a program 120 for execution. Data is supplied from the "TEMP.DATA" file 56 of the storage unit 50, and the program execution result is outputted to the "TEMPORARY" data file of the storage unit 50. At the job step "STEP2", the program "READ" 54 is loaded in the area 100 for execution as the program 122. Data is supplied from the "TEMPORARY" file, and the program execution result is outputted to the "NEW.DATA" file 60 of the storage unit 50. For the job "TEST1", the time reduction function can be applied for the succession of the intermediate data from the job step "STEP1" to the job step "STEP2". The original JCP including the job 130 can therefore be converted into a new JCP including jobs 140A and 140B.

Next, the process to be executed by the generating section 110 will be described in detail. When the execution of the job "TEST1" starts, the section 110 generates the job execution start information table 300 shown in FIG. 2, and when the execution of the job is completed, it generates the job execution end information table 400 shown in FIG. 3. During the job execution, each time the execution of a job step is completed, the job step execution end information table 500 is generated. When the program running at each job step issues a command (CLOSE command) declaring an access completion, the file access history information table 600 is generated for the closed file.

Each table 300, 400, 500, and 600 is generated in the order of event occurrence. Namely, at the start of executing the job "TEST1", the execution start information table 300 for the job "TEST1" is generated by the generating section 111. Next, at the time of accessing a file during the execution of the job step "STEP1", two tables 600 for "INFD" and "OUTFD" are generated by the generating section 112. At the time of completing the execution of the job step "STEP1", the end information table 500 is generated by the generating section 111. At the time of accessing the file during the execution of the job step "STEP2", two tables 600 for "INPUT" and "OUTPUT" are generated by the generating section 112. At the time of completing the execution of the job step "STEP2", the end information table 500 is generated by the generating section 111. Lastly, the end information table 400 is generated by the generating section 111.

Figure 22:
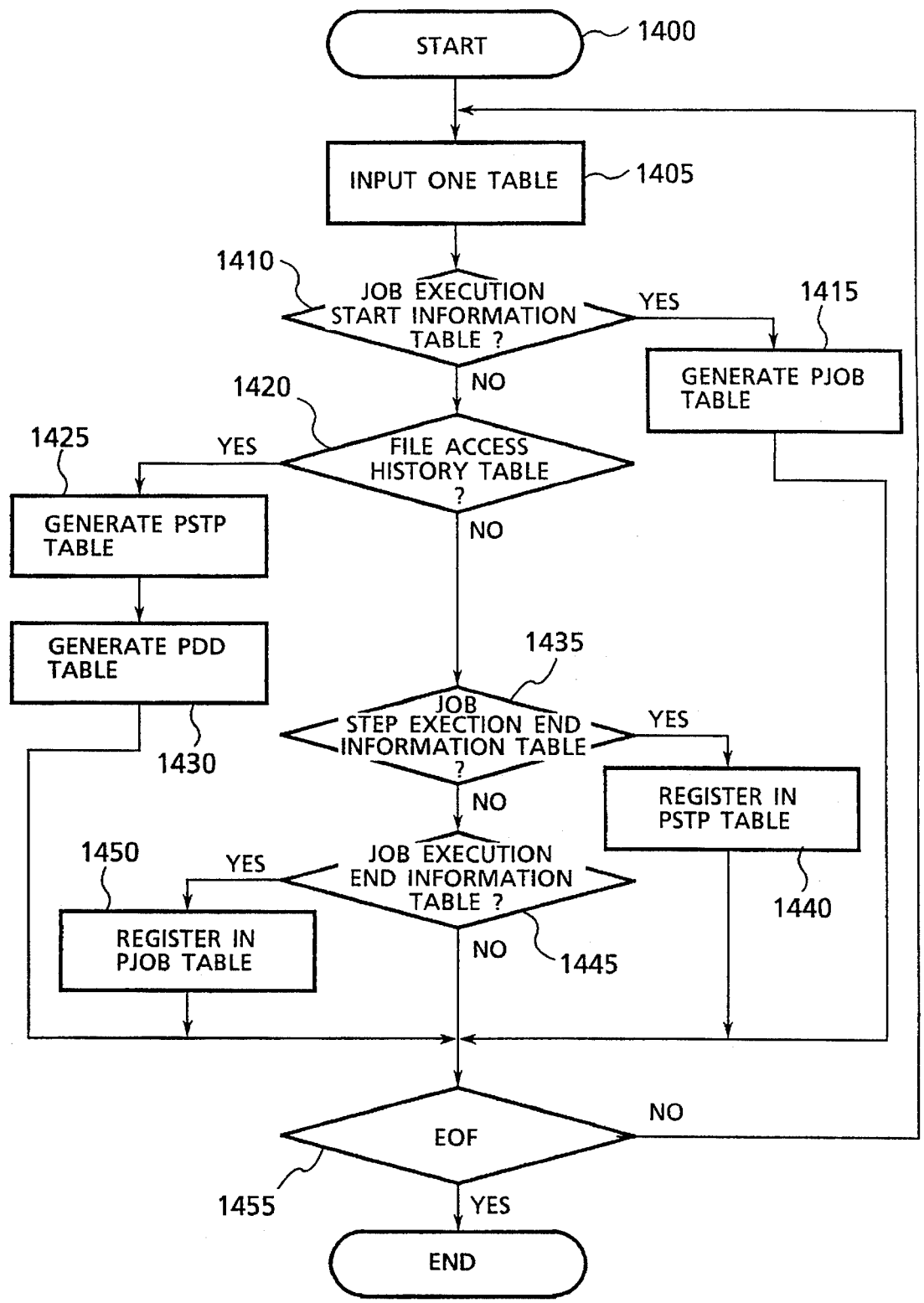
FIG. 22 is a flow chart illustrating the operation of the table group generating process to be executed by the determining section.

Referring to FIG. 22, the operation of the determining section 1300 will be described. At Step 1405, the tables of the system operation state information is sequentially inputted. At Step 1410, it is checked whether the inputted table is the job execution start information table 300, i.e., it is checked whether the identifier 310 is X'01'. If the identifier 310 is X'01', the procedure advances to Step 1415, and if not, the procedure advances to Step 1420. At Step 1415, the job execution history table PJOB 710 is generated to register therein the job execution start time 715 and job name 717. The generated PJOB table 710 is registered in the queue by use of the PMST table, and thereafter the procedure advances to Step 1455.

At Step 1420, it is checked whether the inputted table is the file access history information table 600 and whether the program allows to apply the batch processing time reduction function. Namely, it is checked whether the identifier 601 of the inputted table is X'04' or X'05'. If the inputted table satisfies the above conditions, the procedure advances to Step 1425, and if not, the procedure advances to Step 1435. At Step 1425, the PJOB table 710 satisfying the following conditions is searched while referring to the queue of the PJOB tables:

(1) The job name 717 of the PJOB table 710 is the same as that 615 of the inputted table, (2) The job execution start time 715 of the PJOB table 710 is the same as that 620 of the inputted table, and (3) The job execution end time 716 is not still registered.

The execution start information table 300 of a job to which belongs the program accessing the file registered in the inputted table has already been generated by the generating section 111, and the PJOB table 710 corresponding to the table 300 has already been generated by the determining section 1300. As a result, the PJOB table 710 satisfying the above-described three conditions exists necessarily.

Next, the job step execution history table PSTP 720 satisfying the following four conditions is searched from the PSTP table queue managed by the searched PJOB table 710:

(1) The job step name 725 of the PSTP table 720 is the same as that 625 of the inputted table, (2) The job step execution start time 726 of the PSTP table 720 is the same as that 630 of the inputted table, (3) The job step execution end time 727 is not still registered, and (4) The job step number 728 is not still registered.

If the PSTP table 720 satisfying the above-described four conditions cannot be searched, the area for a new PSTP table 720 is prepared so as to copy therein the job step name 625 and job step execution start time 630 from the inputted table. In this manner, the new PSTP table 720 is generated. Lastly, taking as an objective table the new PSTP table 720 or the PSTP table 720 satisfying the above four conditions, the procedure advances to Step 1430.

At Step 1430, the area for the file access history table PDD 730 is prepared so as to copy therein the FD name 733, file name 734, device information 735, identifier 736, file access number 737, file access start time 738, file access end time 739, and access method 73A from the inputted table. The generated PDD table 730 is connected to the last entry of the PDD tables 733 queue managed by the PSTP table 720 identified at Step 1425. Thereafter, the procedure advances to Step 1455.

At Step 1435, it is checked whether the inputted table is the job step execution end information table. Namely, it is checked whether the identifier 510 of the inputted table is X'03'. If the identifier of the inputted table is X'03', the procedure advances to Step 1440, and if not, the procedure advances to Step 1455. At Step 1440, the table PJOB 710 satisfying the following three conditions is searched while referring to the queue of the PJOB tables 710:

(1) The job name 717 of the PJOB table 710 is the same as that 520 of the inputted table, (2) The job execution start time 715 of the PJOB table 710 is the same as that 550 of the inputted table, and (3) The job execution end time 716 of the PJOB table 710 is not still registered.

The table 300 of a job to which the job step recorded in the inputted table belongs has already been generated by the generating section 111, and the PJOB table 710 corresponding to the table 300 has already been generated by the determining section 1300. As a result, the PJOB table 710 satisfying the above three conditions exists necessarily.

Next, the PSTP table 720 satisfying the following four conditions is searched by referring to the PSTP tables 720 queue managed by the searched PJOB table 710:

(1) The job step name 725 of the PSTP table 720 is the same as that 540 of the inputted table, (2) The job step execution start time 726 of the PSTP table 720 is the same as that 560 of the inputted table, (3) The job step execution end time 727 of the PSTP table 720 is not still registered, and (4) The job step number 728 of the PSTP table 720 is not still registered.

If the PSTP table 720 satisfying the above-described four conditions can be searched, the job step execution end time 727 and job step number 728 from the inputted table are registered in the searched PSTP table 720. If the table PSTP 720 satisfying the above-described four conditions cannot be searched, the area of a new PSTP table 720 is prepared so as to copy therein the job step name 725, job step execution start time 726, job step execution end time 727, and job step number from the inputted table. Lastly, the newly generated PSTP table 720 or the searched PSTP table 720 satisfying the above four conditions is connected to the last entry of the PSTP table queue. Thereafter, the procedure advances to Step 1455.

At Step 1445, it is checked whether the inputted table is the job execution end information table. Namely, it is checked whether the identifier 410 of the inputted table is X'02". If the identifier 410 of the inputted table is X'02', the procedure advances to Step 1450, and if not, the procedure advances to Step 1455. At Step 1450, the table PJOB 710 satisfying the following three conditions is searched:

(1) The job name 717 of the PJOB table 710 is the same as that 420 of the inputted table, (2) The job execution start time 715 of the PJOB table 710 is the same as that 430 of the inputted table, and (3) The job execution end time 716 of the PJOB table 710 is not still registered.

The table 300 of job execution start information corresponding to the job execution end information registered in the inputted table has already been generated by the generating section 111, and the PJOB table 710 corresponding to the table 300 has already been generated by the determining section 1300. As a result, the PJOB table 710 satisfying the above three conditions exists necessarily. Next, the job execution end time 716 given by the inputted table is copied to the searched table PJOB 710.

At Step 1455, it is checked whether the inputted table is the last table. If it is the last table, the input process for the system operation state information is terminated. If not, the procedure returns to Step 1405 whereat the next table is inputted to repeat the processes described above.

Figure 23:
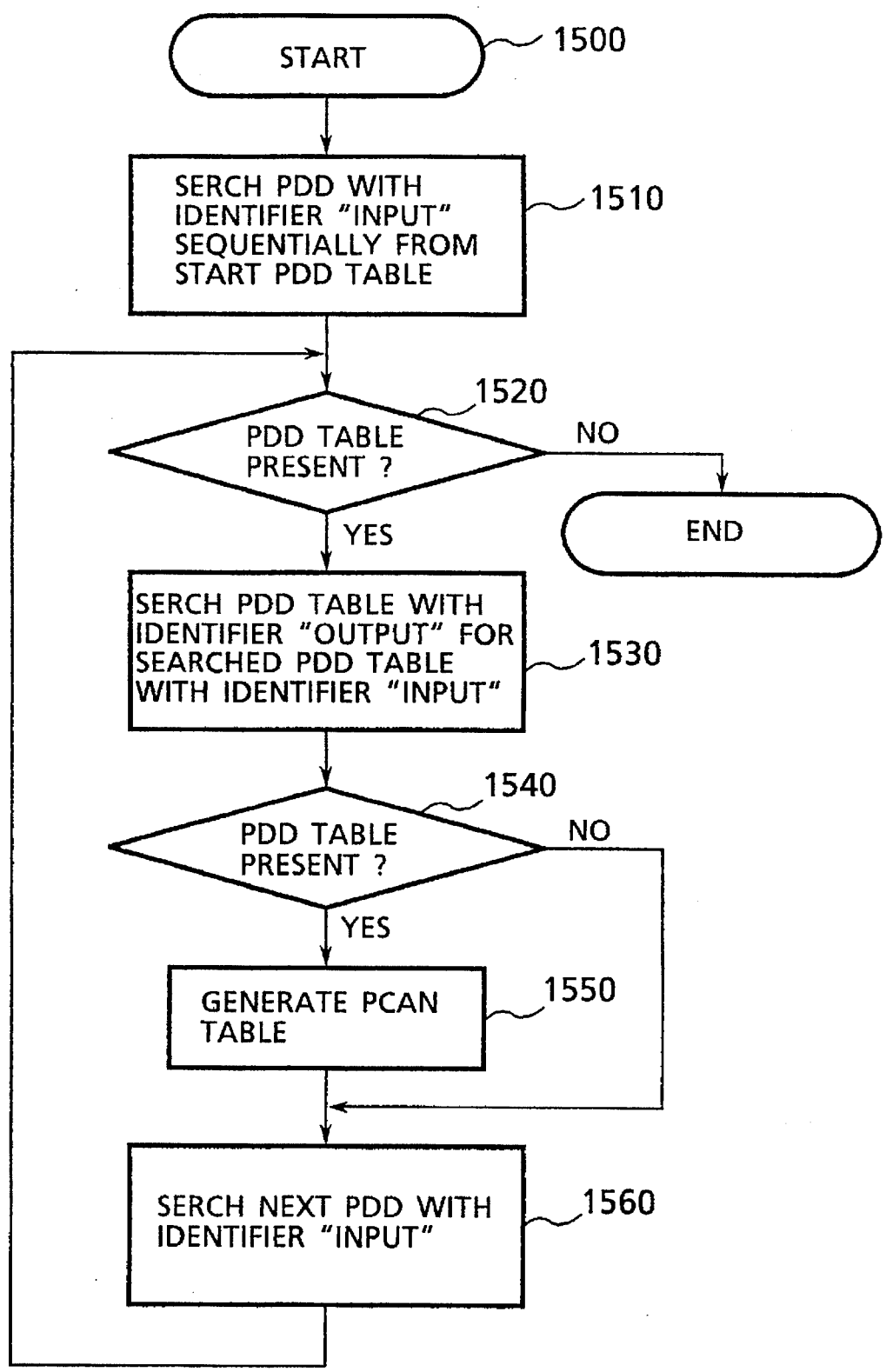
FIG. 23 is a flow chart illustrating the analysis process to be executed by the determining section.
Figure 24:
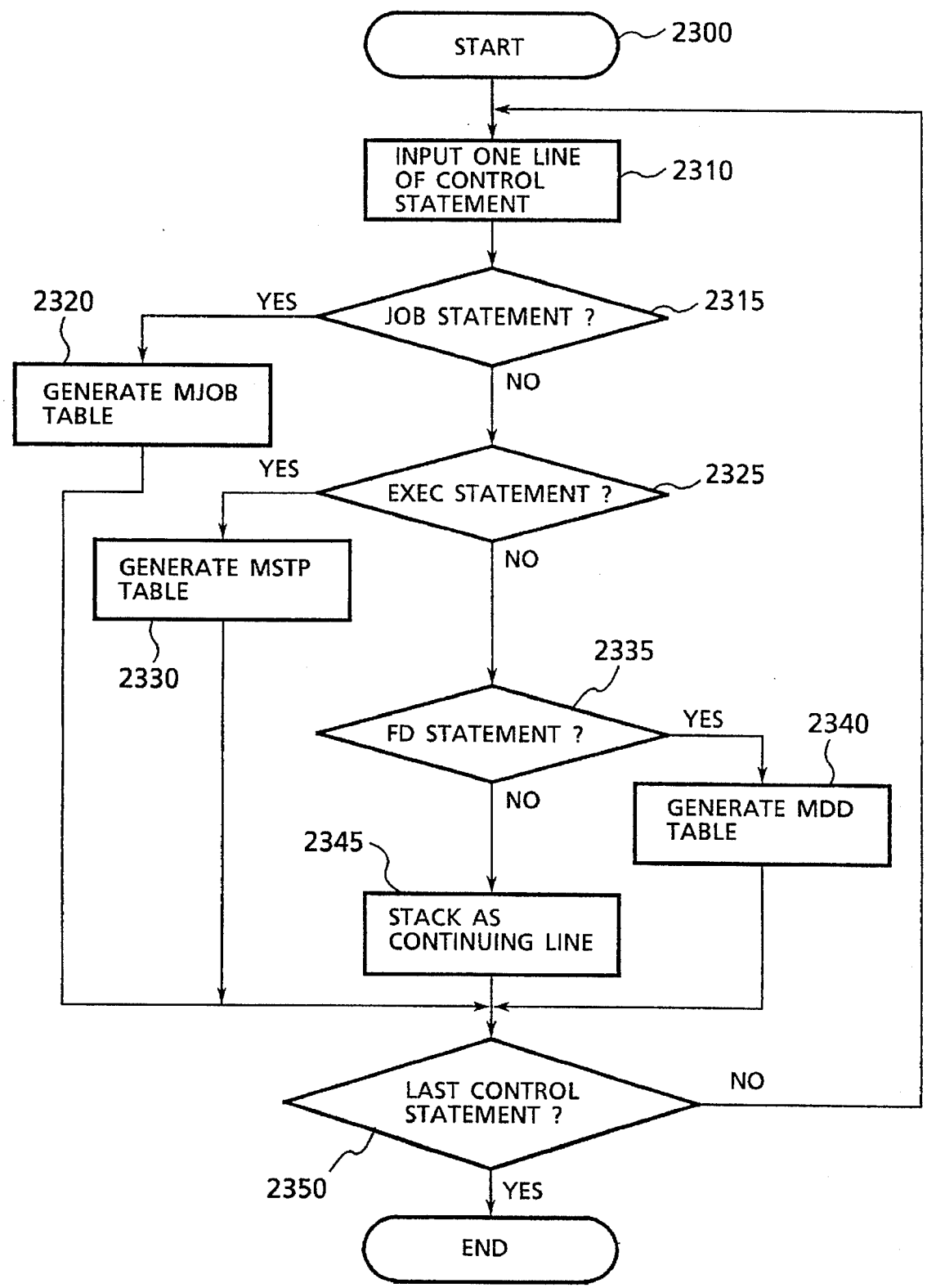
FIG. 24 is a flow chart illustrating the input process to be executed by the converting section.

FIG. 23 is a flow chart illustrating the details of the analysis process 1500 by the determination executing section 1304 shown in FIG. 21. At Step 1510, the PDD table 730 having X'04' as its identifier 736 is searched for. The search order is defined as follows:

(1) The PJOB table 710 is searched for starting from the first entry of the queue of the PJOB tables 710, (2) The PSTP table 720 is searched for starting from the first entry of the queue of the PSTP tables 720 managed by the searched table PJOB 710, (3) The PDD table 730 is searched for starting from the first entry of the queue of the PDD tables 730 managed by the searched PSTP table 720, (4) In the item (3) above, after searching for the PDD table 730 at the last entry of the queue, the search routine returns to the item (2) above to use as the search objective the PSTP table 720 indicated by the next PSTP table address 721 of the searched PSTP table 720, (5) In the item (2) above, after searching for the table PSTP 720 at the last entry of the queue, the search routine returns to the item (1) above to use as the search objective the PJOB table 710 indicated by the next PJOB table address 711 of the searched PJOB table 710.

At Step 1520, it is checked whether the PDD table 730 having X'04' as its identifier 736 was searched at Step 1510. If searched, the procedure advances to Step 1530, and if not, the procedure is terminated. At Step 1530, the PDD table 733 is searched for which satisfies the determination criteria stored in the criterion table 1302, i.e., which satisfies the following six criteria. It is obvious that although the PDD table 733 is searched by using the queue in this embodiment, it may be searched and determined for each job. The search order is similar to that at Step 1510. That is, the criteria are (1) The PDD table has X'05' as its identifier 736, (2) The PDD table stores the same file name as that 734 described in the PDD table 730 searched for at Step 1510 or Step 1560, (3) The PDD table stores the same device information as that 735 written in the PDD table searched for at Step 151'0 or Step 1560, (4) The PDD table belongs to the same queue of the PDD tables managed by the PSTP table 720, as the queue to which the PDD table 730 searched for at Step 1510 or Step 1560 belongs (In other words, the PDD table is managed by the same PJOB table 710. This means that the PDD table 730 stores the file access information for the job having the same job name 717 and job execution start time 716), (5) The PDD table stores the same file access order as that described in the access method field 73A of the PDD table 730 searched for at Step 1510 or Step 1560, and (6) The PDD table stores the file access end time 738 earlier than the file access start time 739 written in the PDD table 730 searched for at Step 1510 or Step 1560.

At Step 1540, it is checked whether the PDD table 736 satisfying the above six criteria was searched for. If searched, the procedure advances to Step 1550. That the PDD table 730 was searched for means that the time reduction function can be applied for the file input process for the PDD table 730 searched for at Step 1510 or Step 1560 and the file output process for the PDD table 730 searched for at Step 1530. That the PDD table 736 was not searched for means that the time reduction function cannot be applied for the file input process for the PDD table 730 searched for at Step 1510 or Step 1560.

At Step 1550, the area for the determination result table PCAN is first prepared. Next, in accordance with the information of the objective PDD table 730 searched for at Step 1510 or Step 1560, the file name "TEMPORARY" 743 and the input side FD name "DISK" are registered. Further, in accordance with the information of the PSTP table 720 to which the searched PDD table 730 belongs, the input side job step name "STEP2" 748 is registered. Furthermore, in accordance with the information of the PJOB table 710 to which the PSTP table 720 belongs, the input side job name "JOB" is registered. Similarly, in accordance with the information of the objective PDD table 730 searched for at Step 1530, the output side FD name "DISK" 746 is registered. Further, in accordance with the information of the PSTP table 720 to which the objective PDD table 730 belongs, the output side job step name "STEP1" is registered. Furthermore, in accordance with the information of the PJOB table 710 to which the PSTP table 720 belongs, the output side job name "JOB" is registered. Lastly, the determination result table PCAN 740 is connected to the last entry of the queue. At Step 1560, a next objective PDD table 730 is searched for starting from the PDD table 730 next to that searched for at Step 1510 or Step 1560 at the previous cycle, under the same conditions described with Step 1510, and thereafter returning to Step 1520. After completing the analysis process for all the PDD tables, the determining section 1300 notifies the converting section 2600 of jobs of the JCP capable of applying the time reduction function, while referring to the PCAN tables.

Next, the operation of the converting section 2600 will be described. First, referring to FIG. 24, the operation of the input section 2300 will be described. At Step 2310, a JCL statement of one line of the original JCP 130 notified by the determining section 1300 is read. At Step 2315, it is checked whether the inputted JCL statement is a JOB statement. If so, the procedure advances to Step 2320, and if not, the procedure advances to Step 2325. At Step 2320, the area for the JOB statement management table MJOB 1800 is prepared in the area of the table group 2602 so as to copy the job name "JOB" from the inputted JCL statement to the field 1850. Next, the job serial number "1" is registered in the field 1860. The area for the job describing record 1900 is prepared in the area of the table group 2602 so as to copy the contents of the inputted JCL statement to the field 1920. The start address of the job describing record 1900 is stored in the field 1870. Lastly, the MJOB table 1800 is connected to the last entry of the queue, and thereafter the procedure advances to Step 2350.

At Step 2325, it is checked whether the inputted JCL statement is an EXEC statement. If so, the procedure advances to Step 2330, and if not, the procedure advances to Step 2335. At Step 2330, the area for the EXEC statement management table MSTP 2000 is prepared within the area of the table group 2602 so as to copy the job step name "STEP1" from the inputted JCL statement to the field 2050. Next, the job step serial number "1" is registered in the field 2060. The area for the job describing record 1900 is prepared within the area of the table group 2602 so as to copy the contents of the inputted JCL statement to the field 1920. The start address of the record 1900 is stored in the field 2070. Lastly, the MSTP table 2000 is connected to the last entry of the queue, and thereafter the procedure advances to Step 2350.

At Step 2335, it is checked whether the inputted JCL statement is an FD statement. If so, the procedure advances to Step 2340, and if not, the procedure advances to Step 2345. At Step 2340, the area for the FD statement management table MDD 2100 is prepared within the area of the table group 2602 so as to copy the FD name "DISK" from the inputted JCL statement to the field 2140. Next, file name "TEMP.DATA" is copied to the field 2140. Then, the area for the job describing record 1900 is prepared within the area of the table group 2602 so as to copy the contents of the inputted JCL statement to the field 1920. The start address of the record 1900 is stored in the field 2150. Lastly, the queuing operation for the MDD table 2100 is performed in the following sequence, and to thereafter advance to Step 2350:

(1) The last entry of the queue of the MJOB tables 1800 managed by the job converting program table MMST 1700, is obtained, (2) The last entry of the queue of the MSTP tables 200 managed by the MJOB table obtained at the item (1) above, is obtained, and (3) The MDD table 2100 is connected to the last entry of the queue of the MDD tables 2100 managed by the MSTP table 2000 obtained at the item (2) above.

At Step 2345, the area for the job describing record 1900 is prepared within the area of the table group 2602 to store the contents of the inputted JCL statement in the field 1920. Next, the address of the record 1900 is stored as the next entry address in the field 1910 of the job describing record 1900 inputted at the previous cycle.

At Step 2350, it is checked whether the inputted JCL statement is the last one. If so, the procedure terminates, and if not, the procedure returns to Step 2310 to input the next JCL statement and repeat the above processes.

Figure 25:
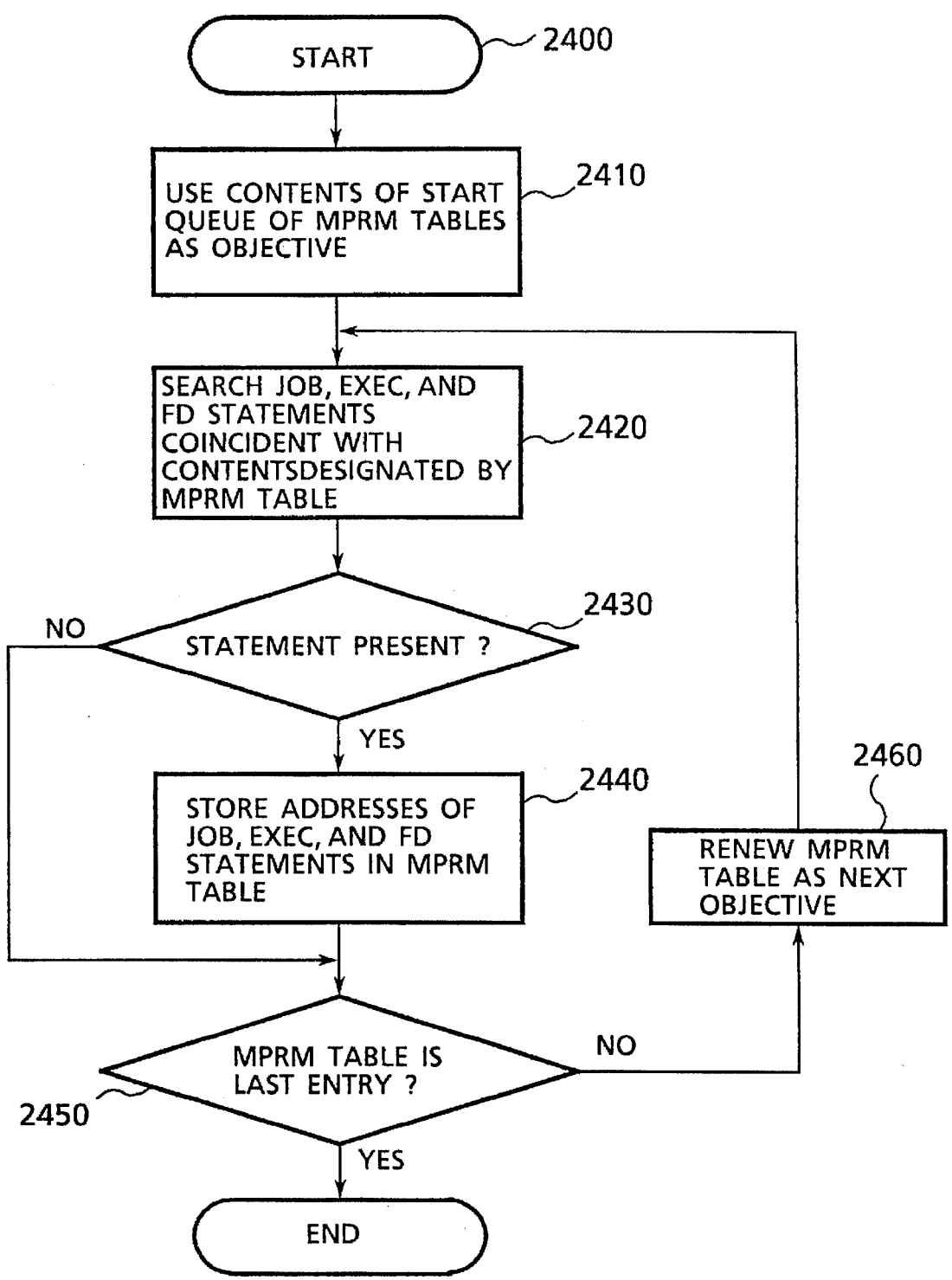
FIG. 25 is a flow chart illustrating the search process to be executed by the converting section.

FIG. 25 is a flow chart illustrating the operation to be executed by the JCL statement search section 2400. At Step 2410, referring to the table group 2602, the contents of the start entry of the queue of the parameter tables MPRM 2200 are obtained as the objective for the JCL statement search. At Step 2420, in accordance with the content of the MPRM table 2200 obtained at Step 2410 or Step 2460 as the objective, the MJOB tables 1800, MSTP table 2000, and MDD table 2100 satisfying the following six search criteria which are part of the search criteria 2604, are obtained:

(1) The MJOB table 1800 has the same job name in its field 1850 as that in the field 2225 of the MPRM table 2200, (2) The MSTP table 2000 belongs to the queue of the MSTP tables 2200 managed by the MJOB table obtained at the item (1) above, and has the same job step name in its field 2050 as that in the field 2230 of the MPRM table 2200, (3) The MDD table 2100 belongs to the queue of the MDD tables 2300 managed by the MSTP table 2200 obtained at the item (2) above, and has the same file name in its field 2140 as that in the field 2210 of the MPRM table 2200, (4) The MJOB table 1800 has the same job name in its field 1850 as that in the field 2240 of the MPRM table 2200, (5) The MSTP table 2000 belongs to the queue of the MSTP tables 2200 managed by the MJOB table 1800 obtained at the item (4) above, and has the same job step name in its field 2050 as that in the field 2230 of the MPRM table 2200, and (6) The MDD table 2100 belongs to the queue of the MDD tables 2300 managed by the MSTP table 2200 obtained at the item (5) above, and has the same file name in its field 2140 as that in the field 2210 of the MPRM table 2200.

At Step 2430, it is checked whether the MJOB table 1800, MSTP table 2000, and MDD table 2100 satisfying the above-described six criteria were searched for. If these tables exist, the procedure advances to Step 2440, and if not, the procedure advances to Step 2450. At Step 2440, the information of the search result is registered in the MPRM table 2200. Specifically, the contents of the field 1870 of the MJOB table 1800 corresponding to the output side job are copied to the field 2255. The contents of the field 2070 of the MSTP table 2000 corresponding to the output side job are copied to the field 2260. The contents of the field 2150 of the MDD table 2100 corresponding to the output side job are copied to the field 2265. The contents of the field 1870 of the MJOB table 1800 corresponding to the input side job are copied to the field 2270. The contents of the field 2070 of the MSTP table 2000 corresponding to the input side job are copied to the field 2275. The contents of the field 2150 of the MDD table 2100 corresponding to the input side job are copied to the field 2280. At Step 2450, it is checked whether the MPRM table 2200 used as the objective corresponds to the last entry of the queue. If it corresponds to the last entry, the procedure is terminated, and if not, the procedure advances to Step 2460. At Step 2460, the MPRM table 2200 pointed by the next MPRM table address 2210 is used as the objective for the search, and the procedure returns to Step 2420 to repeat the above processes.

Figure 26:
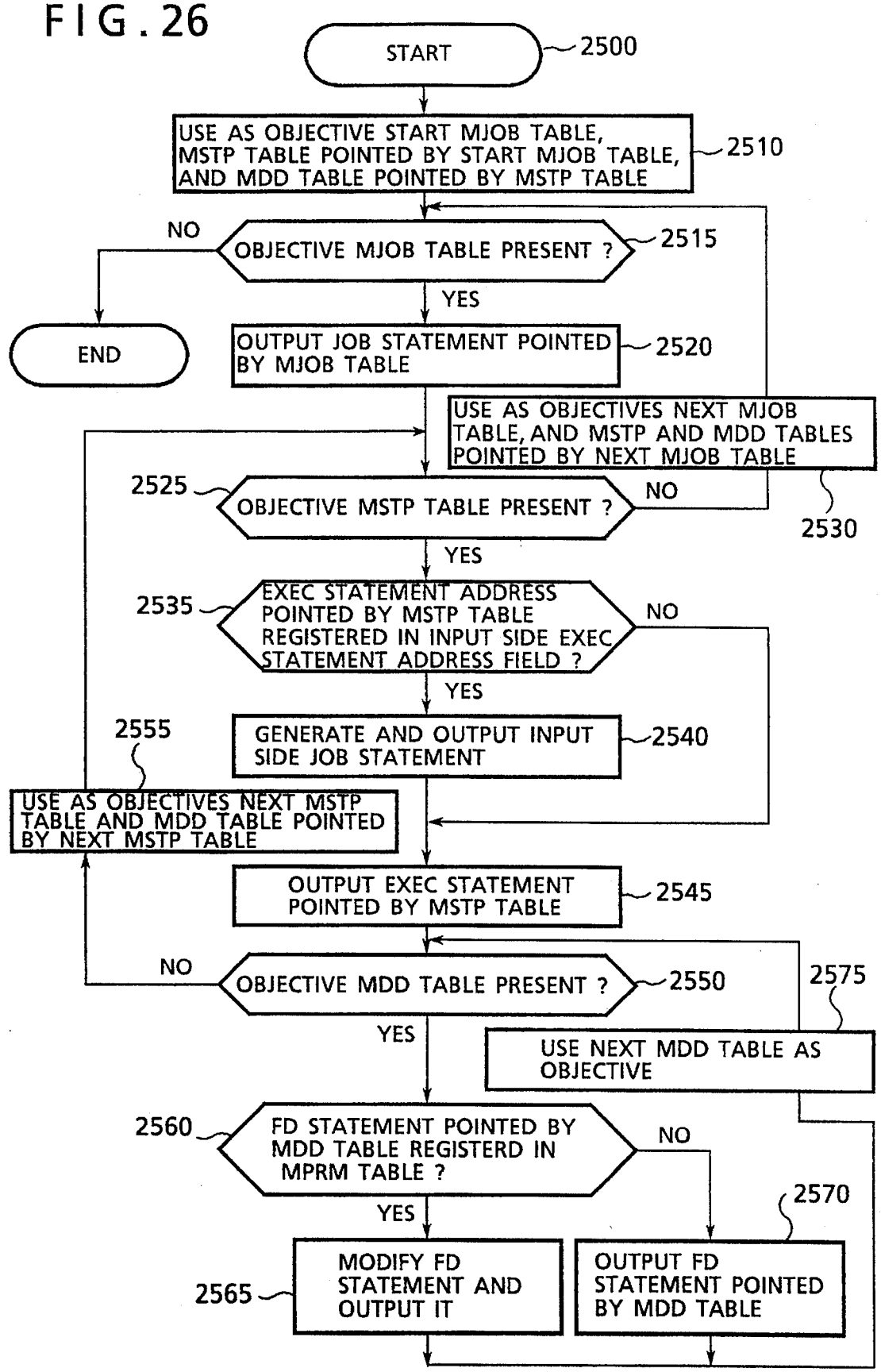
FIG. 26 is a flow chart illustrating the conversion process to be executed by the converting section.

FIG. 26 is a flow chart showing the operation to be executed by the conversion executing section 2500. At Step 2510, referring to the table group 2602, the start entry of the queue of the MJOB tables 1800 managed by the MMST table 1700 is used as the objective. The start entry of the queue of MSTP tables 200 managed by the objective MJOB table 1800 is used as the objective. The start entry of the queue of the MDD tables 2100 managed by the objective MSTP table 2000 is used as the objective. At Step 2515, it is checked whether the objective MJOB table 1800 was found. Namely, it is checked whether the JCL statement was already outputted which statement is managed by the MJOB table 1800 pointed by the last MJOB table address 1710 within the queue of the MJOB tables 1800 managed by the MMST table 1700. If already outputted, the procedure is terminated, and if not, the procedure advances to Step 2520. At Step 2520, the contents "JOB" in the field 1920 of the job describing record 1900 pointed by the field 1870 of the MJOB table 1800 are outputted to a portion of a new JCP for the new job 140A. At Step 2525, it is checked whether the objective MSTP table 2000 was found. Namely, it is checked whether all the contents of the job describing record 1900 pointed by each entry of the queue of the MSTP tables 2000 managed by the MJOB table 1800 determined as the objective at Step 2520 were outputted. If outputted, the procedure advances to Step 2530, and if not, the procedure advances to Step 2535. At Step 2530, the MJOB table 1800 pointed by the field 1810 of the MJOB table 1800 determined as the objective at Step 2520 is used as the objective. The start entry of the queue of the MSTP tables 2000 managed by the objective MJOB table 1800 is used as the objective. The start entry of the queue of the MDD tables 2100 managed by the objective MSTP table 2000 is used as the objective. Thereafter, the procedure returns to Step 2515 to repeat the above processes.

At Step 2535, it is checked whether there is the MPRM table 2200 having the field 2275 storing the same contents as those in the field 2070 of the objective MSTP table 2000. If there is such a MPRM table 2200, the procedure advances to Step 2540, and if not, the procedure advances to Step 2545. At Step 2540, the JOB statement for the input side job is generated and outputted to a portion of the new JCP for the new job 140B. The name of this job is "JOB" registered in the field 2220 of the MPRM table 2100 searched at Step 2535. At Step 2545, the contents such as "STEP PROGRAM=WRITE" in the field 1910 of the job describing record 1900 pointed by the field 2070 of the objective MSTP table 2000 are outputted to the new JCP portions for the new jobs 140A and 140B. At Step 2550, it is checked whether the objective MDD table 2100 was found. Namely, it is checked whether the FD JCL statement was already outputted which statement corresponds to the MDD table 2100 pointed by the field 2040 of the MSTP table 2000 determined as the objective at Step 2545. If outputted, the procedure advances to Step 2555, and if not, the procedure advances to Step 2560.

At Step 2555, the MSTP table 200 pointed by the field 2010 of the MSTP table 2000 determined as the objective at Step 2545 is used as the objective. The start entry of the queue of the MDD tables 2100 managed by the objective table MSTP 2000 is used as the objective. Thereafter, the procedure returns to Step 2525 to repeat the above processes. At Step 2560, it is checked whether there is the MPRM table 2200 having the field 2280 storing the same contents as those in the field 2150 of the objective MDD table 2100. If there is such a MPRM table 2200, the procedure advances to Step 2565, and if not, the procedure advances to Step 2570. At Step 2565, referring to the replacement JCL statement 2606, the contents of the FD statements are converted for the application of the time reduction function to output the new JCP portions for the new jobs 140A and 140B. As the operand of "FILE", the contents of field 2215 of the MPRM table 2200 are designated. As the operand of "DEVICE", the time reduction function "PREST" is designated. As the operand of "TYPE", "SHARE" is designated. Thereafter, the procedure advances to Step 2575. At Step 2570, the contents of the job describing record 1900 pointed by the field 2150 of the objective MDD table 2100 are outputted to the new JCP portions for the new jobs 140A and 140B. At Step 2575, the MDD table 2100 pointed by the field 2110 of the MDD table 2100 determined as the objective at Step 2565 and Step 2570 is used as the objective. Thereafter, the procedure returns to Step 2550 to repeat the above processes.

In the above-described manner, the new jobs 140A and 140B are generated. As shown in FIG. 20A, the new job 140A is for outputting the intermediate data which is called the output side job. In order to output the intermediate data from the new JCP portion for the new job 140A, the file name "TEMPORARY" is designated as the operand of "FILE" of OUTFD, "PREST" is designated as the operand of "DEVICE", and "SHARE" is designated as the operand of "TYPE". As shown in FIG. 20B, the new JCP portion for the new job 140B is for inputting the intermediate data which is called the input side job. In order to input the intermediate data to the new JCP portion for the new job 140B, the file name "TEMPORARY" is designated as the operand of "FILE" of INPUT, "PREST" is designated as the operand of "DEVICE", and "SHARE" is designated as the operand of "TYPE".

The computer system for supporting the application of the batch processing time reduction function has been described above. The present invention is also applicable to other functions such as a program loading speed-up function and a file input/output speed-up function. The program loading speed-up function may be used in the following manner. The generating section 110 outputs system operation state information like the case of the batch processing time reduction function. However, the name of a program to be executed by each job step is additionally provided. A reference number is set to the criterion table 1302 of the determining section 1300, to check whether the number of executions of each program executed by the determination executing section 1304 reaches a reference number or more. If the number of executions reaches the reference number or more, a notice of such effect is outputted to the converting section 2600. In response to this notice, the converting section 2600 writes as the system parameter 160 the name such as "READ" of the program executed the reference number or more times. When the system is reset, IPL runs so that in accordance with the system parameter, the program "READ" is loaded from the storage unit 50 to the program area 100 and stays resident. It is therefore unnecessary to load the program "READ" from the storage unit 50 to the program area 100 each time a job requiring the program "READ" is executed.

In a modification of the embodiment, the determination criterion (6) at Step 1530 (FIG. 23) is replaced by the following criterion (7).

(7) The file access history table PDD is managed by the job step execution history table PSTP 720 storing the job step execution end time 727 earlier than the job step execution start time 736 of the table PSTP 720 managed by the table PDD 730 determined at Step 1510 or Step 1560. In the computer system of this modification, the data succession process between job steps capable of using "PREST" can be judged basing upon the job step execution start and end times, and the job can be converted so as to use "PREST".

In another modification of the embodiment, the determination criterion (6) at Step 1530 (FIG. 23) is replaced by the following criterion (8). (8) The file access history table PDD is managed by the PSTP table 720 storing the job step number 728 earlier than that 728 of the PSTP table 720 managing the table PDD 730 determined at Step 1510 or Step 1560. In the computer system of this modification, the data succession process between job steps capable of using "PREST" can be judged basing upon the job step numbers, and the job can be converted.

In a further modification of the embodiment, the determination criterion (4) at Step 1530 (FIG. 23) is replaced by the following criterion (9), and Steps 2535 and 2540 shown in FIG. 26 are omitted. (9) The table PDD table belongs to the queue of the PDD tables managed by the PSTP table 720 belonging to the queue different from that of the PSTP tables 720 managing the queue to which the PDD table 730 determined at Step 1510 or Step 1560 belongs. In the computer system of this modification, since the data succession process between jobs uses "PREST", the processes at Steps 2535 and 2540 are not necessary which divide one job into two jobs to use "PREST" for the data succession process between job steps.

In a still further modification of the embodiment, the determination criteria (4) and (6) at Step 1530 (FIG. 23) are replaced by the criteria (7) and (9), and Steps 2535 and 2540 shown in FIG. 26 are omitted. In the computer system of this modification, the data succession process between jobs capable of using "PREST" can be judged basing upon the job execution start and end times, and the job can be converted so as to use "PREST".

What is claimed is:

1. A computer system comprising:

first storage means for storing data files;

second storage means for storing job programs each of which is prepared for accessing said data files;

executing means for executing a plurality of said job programs parallelly or sequentially;

system monitoring means for monitoring said system, in accordance with job program executions performed by said executing means, so as to obtain, with respect to individual ones of said job program executions, a system operation status information including a job program name, a data file name to which said job program accesses, an access type representing whether the access to said data file is read access or write access, an access start time indicating when the access starts, an access end time indicating when the access is completed, and a record access order indicating order of accesses to respective records in said data file from said job program;

searching means fog searching a first and a second job programs to which a selected utility function is applicable, wherein said first and second job programs access a same file, said access type of said first job program indicates write access and said access type of said second job program indicates read access, said record access order of said first and second job program coincide with each other, and said access end time of said first job program is prior to said access start time of said second job program; and outputting means for outputting a report identifying said retrieved pair of job programs.

2. The computer system of claim 1 further comprising:

inputting means for inputting a job control statement including a plurality of records containing instructions for execution of jobs obtained by said searching means;

second searching means for searching a record, from said inputted job control statement, containing a file identifier obtained by said searching means;

converting means for converting said searched record so as to apply said utility function to said searched record; and outputting means for outputting said converted job control statement.

3. A computer system comprising:

first storage means for storing data files;

second storage means for storing job programs each of which is prepared for accessing said data files;

executing means for executing a plurality of said job programs parallelly or sequentially;

system monitoring means for monitoring said system, in accordance with job program executions performed by said executing means, so as to obtain, with respect to individual ones of said job program executions, a system operation status information including a job program name, a job start time indicating when the job program execution starts, a job end time indicating when the job program execution is completed, a data file name to which said job program accesses, an access type representing whether the access to said data file is read access or write access, and a record access order indicating order of accesses to respective records in said data file from said job program;

searching means for identifying first and second job programs to which a selected utility function is applicable wherein said first and second job programs access a same file, said access type of said first job program indicates write access and said access type of said second job program indicates read access, said record access order of said first and second job programs coincide with each other, and said job end time of said first job program is prior to said job start time of said second job program; and outputting means for outputting a report identifying said first and second job programs.

4. The computer system of claim 3 further comprising:

inputting means for inputting a job control statement including a plurality of records containing instructions for execution of jobs obtained by said searching means;

second searching means for searching a record, from said inputted job control statement, containing a file identifier obtained by said searching means;

converting means for converting said searched record so as to apply said utility function to said searched record; and outputting means for outputting said converted job control statement.

5. A computer system comprising:

first storage means for storing data files;

second storage means for storing job programs including at least one job step prepared for accessing said data files;

executing means for executing a plurality of said job steps parallelly or sequentially;

system monitoring means for monitoring said system, in accordance with job step executions performed by said executing means, so as to obtain, with respect to individual ones of said job step executions, a system operation status information including a job step name, a job step access time indicating when the job step starts access to the data file, a job step access end time indicating when the job step access to the data is completed, a data file name to which said job step accesses, an access type representing whether the access to said data file is read access or write access, and a record access order indicating order of accesses to respective records in said data file from said job step;

searching means for searching first and second job steps from the job step executions to apply a selected utility function to the job programs wherein said first and second job steps access a same file, said access type of said first job step indicates write access and said access type of said second job step imitates read access, said .record access order of said first and second job steps coincide with each other, and said job step access end time of said first job step is prior to said job step access start time of said second job step; and outputting means for outputting a report identifying said first and second job steps.

6. The computer system of claim 5 comprising:

inputting means for inputting job control statements including a plurality of records containing instructions for execution of jobs in which said job steps obtained by said searching means are for identifying a pair of job steps;

second searching means for searching, from said inputted job control means, job steps whose said file identifier obtained by said searching means represents input;

converting means for converting said inputted job control means to a job control statement including job steps executed before execution of said searched job step, and job control statements including job steps executed after execution of said searched job step;

third searching means for searching, from said inputted job control statements, a record containing a file identifier obtained by said searching means, and for converting said searched record so as to apply said utility function; and outputting means for outputting said converted job statements.

7. A computer system comprising:

first storage means for storing data files;

second storage means for storing job programs including at least one job step prepared for accessing said data files;

executing means for executing a plurality of said job steps parallelly or sequentially;

system monitoring means for monitoring said system, in accordance with job step executions performed by said executing means, so as to obtain, with respect to individual ones of said job step executions, a system operation status information including a job step name, a job step start time indicating when the job step execution starts, a job step end time indicating when the job step execution is completed, a data file name to which said job step accesses, an access type representing whether the access to said data file is read access or write access, and a record access order indicating order of accesses to respective records in said data file from said job step;

searching means for identifying a first and a second job steps from said job step executions to apply a selected utility function to the job programs wherein said first and second job steps access a same file, said access type of said first job step indicates write access and said access type of said second job step indicates read access, said record access order of said first and second job programs coincide with each other, and said job step end time of said first job step is prior to said job step start time of said second job step; and outputting means for outputting a report identifying said first and second job steps.

8. The computer system of claim 7 comprising:

inputting means for inputting job control statements including a plurality of records containing instructions for execution of jobs in which said job steps obtained by said searching means for identifying a pair of job steps;

second searching means for searching, from said inputted job control means, job steps whose said fat identifier obtained by said searching means represents input;

converting means for converting said inputted job control means to a job control statement including job steps executed before execution of said searched job step, and job control statements including job steps executed after execution of said searched job step;

third searching means for searching, from said inputted job control statements, a record containing a file identifier obtained by said searching means, and for converting said searched record so as to apply said utility function; and outputting means for outputting said converted job control statements.

9. A computer system comprising:

first storage means for storing data files;

second storage means for storing job programs including at least one job step prepared for accessing said data files;

executing means for executing a plurality of said job steps parallelly or sequentially;

system monitoring means for monitoring said system, in accordance with job step executions performed by said executing means, so as to obtain, with respect to individual ones of said job step executions, a system operation status information including a job step name, a job step execution order indicating the order of said job step execution, a data file name to which said job step accesses, an access type representing whether the access to said data file is read access or write access, and a record access order indicating order of accesses to respective records in said data file from said job step;

searching means for searching a first and second job from said job step executions to which a selected utility function is applicable, said first and second job steps access a same file, said access type of said first job step indicates write access and said access type of said second job step indicates read access, said record access order of said first and second job steps coincide with each other, and said job step execution order of said first job step is prior to said job step execution order of said second job step; and outputting means for outputting a report identifying said first and second job steps.

10. The computer system of claim 9 comprising:

inputting means for inputting job control statements including a plurality of records containing instructions for execution of jobs in which said job steps obtained by said searching means are for identifying a pair of job steps;

second searching means for searching, from said inputted job control means, job steps whose said file identifier obtained by said searching means represents input;

converting means for converting said inputted job control means to a job control statement including job steps executed before execution of said searched job step, and job control statements including job steps executed after execution of said searched job step;

third searching means for searching, from said inputted job control statements, a record containing a file identifier obtained by said searching means, and for converting said searched record so as to apply said utility function; and outputting means for outputting said converted job statements.

11. In a computer system in which data are exchanged between a plurality of processing units defined by control information through an intermediate file on a main memory in order to execute predetermined processings on the computer system, a processing unit extracting method for extracting a processing unit to which a utility function for performing parallel execution of at least two processing units is applicable, comprising the steps of:

executing processings for a plurality of processing units which are defined by control information predetermined on the computer system;

collecting execution information relating to execution status for respective ones of said plurality of processing units comprising monitoring said system in accordance with processing unit executions performed by said executing processings, so as to obtain, with respect to individual ones of said processing unit executions, a system operation status information including a processing unit name, a data file name to which said processing unit accesses an access type representing whether the access to said data file is read access or write access, an access start time indicating when the access starts, an access end time indicating when the access is completed, and a record access order indicating order of accesses to respective records in said data file from said processing unit;

with respect to each of said plurality of processing units, analyzing the collected execution information and determining whether application of said utility function thereto is possible or not based on a predetermined criteria of determination comprising searching means for searching a first and a second job programs to which a selected utility function is applicable, wherein said first and second job programs access a same file, said access type of said first job program indicates write access and said access type of said second job program indicates read access, said record access order of said first and second job program coincide with each other, and said access end time of said first job program is prior to said access start time of said second job program; and extracting a processing unit to which said function is applicable in accordance with the result of said determining.

* * * * *